US012118991B2

(12) United States Patent
Saito

(10) Patent No.: US 12,118,991 B2
(45) Date of Patent: Oct. 15, 2024

(54) INFORMATION PROCESSING DEVICE, INFORMATION PROCESSING SYSTEM, AND INFORMATION PROCESSING METHOD

(71) Applicant: SONY CORPORATION, Tokyo (JP)

(72) Inventor: Mari Saito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 761 days.

(21) Appl. No.: 17/250,366

(22) PCT Filed: May 29, 2019

(86) PCT No.: PCT/JP2019/021305
§ 371 (c)(1),
(2) Date: Jan. 11, 2021

(87) PCT Pub. No.: WO2020/017165
PCT Pub. Date: Jan. 23, 2020

(65) Prior Publication Data
US 2021/0319790 A1    Oct. 14, 2021

(30) Foreign Application Priority Data

Jul. 20, 2018  (JP) .................................. 2018-136671

(51) Int. Cl.
*G10L 15/22* (2006.01)
*G06F 3/16* (2006.01)
*G10L 17/22* (2013.01)

(52) U.S. Cl.
CPC .............. *G10L 15/22* (2013.01); *G06F 3/167* (2013.01); *G10L 17/22* (2013.01); *G10L 2015/223* (2013.01); *G10L 2015/225* (2013.01)

(58) Field of Classification Search
CPC ... G06F 3/167; G10L 15/22; G10L 2015/223; G10L 17/22; G10L 2015/225
See application file for complete search history.

(56) References Cited

U.S. PATENT DOCUMENTS 6,178,404 B1 *  1/2001  Hambleton ............. G10L 15/22
                                         704/E15.04
7,869,998 B1 *  1/2011  Di Fabrizio .......... G10L 15/22
                                         704/251
(Continued)

FOREIGN PATENT DOCUMENTS

CN       1701287 A      11/2005
CN     107408027 A      11/2017
(Continued)

OTHER PUBLICATIONS

International Search Report and Written Opinion of PCT Application No. PCT/JP2019/021305, issued on Aug. 27, 2019, 10 pages of ISRWO.

*Primary Examiner* — Samuel G Neway
(74) *Attorney, Agent, or Firm* — CHIP LAW GROUP

(57) ABSTRACT

Implemented is a configuration of being able to reliably notify a device characteristic to a user by naturally generating and outputting a system speech including the device characteristic during an interaction with the user. The configuration includes a data processing section that generates and outputs a system speech including device characteristic information. The data processing section selects device characteristic information that is relevant to what is talked about during an interaction between the user and the information processing device, and generates and outputs a system speech including the selected device characteristic information. The data processing section receives an input of information of a user selection made to an option presented to the user, includes device characteristic information that is relevant to the inputted selection information into a system speech to be executed in an interaction with the user, and outputs the system speech.

12 Claims, 11 Drawing Sheets

(56) References Cited

U.S. PATENT DOCUMENTS

| | | | |
|---|---|---|---|
| 10,271,093 B1* | 4/2019 | Jobanputra | H04N 21/835 |
| 2004/0006475 A1* | 1/2004 | Ehlen | G10L 15/22 |
| | | | 704/E15.04 |
| 2005/0165607 A1* | 7/2005 | Di Fabbrizio | G06F 40/30 |
| | | | 704/E15.04 |
| 2006/0100880 A1 | 5/2006 | Yamamoto et al. | |
| 2013/0275875 A1* | 10/2013 | Gruber | G06F 3/167 |
| | | | 715/728 |
| 2016/0071517 A1* | 3/2016 | Beaver | G06F 40/35 |
| | | | 704/9 |
| 2017/0091612 A1* | 3/2017 | Gruber | G06F 3/0488 |
| 2017/0106539 A1* | 4/2017 | Maisonnier | G10L 15/1815 |
| 2018/0068657 A1* | 3/2018 | Khan | G06F 40/30 |
| 2018/0074785 A1* | 3/2018 | Ohmura | G06F 3/0487 |
| 2018/0096686 A1* | 4/2018 | Borsutsky | G10L 15/22 |
| 2018/0308491 A1* | 10/2018 | Oktem | G10L 17/00 |
| 2019/0237072 A1* | 8/2019 | Yang | G10L 15/1815 |
| 2020/0013404 A1* | 1/2020 | Sugiyama | G06F 3/01 |
| 2021/0319790 A1* | 10/2021 | Saito | G06F 3/167 |

FOREIGN PATENT DOCUMENTS

| | | | | |
|---|---|---|---|---|
| EP | 1542101 A1 | 6/2005 | | |
| EP | 3279790 A1 | 2/2018 | | |
| JP | 2003-256421 A | 9/2003 | | |
| JP | 2006-030464 A | 2/2006 | | |
| JP | 2007-133728 A | 5/2007 | | |
| JP | 2017-211610 A | 11/2017 | | |
| WO | 2004/027527 A1 | 4/2004 | | |
| WO | WO-2016157662 A1 * | 10/2016 | | G06F 3/04817 |
| WO | 2017/200079 A1 | 11/2017 | | |

\* cited by examiner

FIG. 6
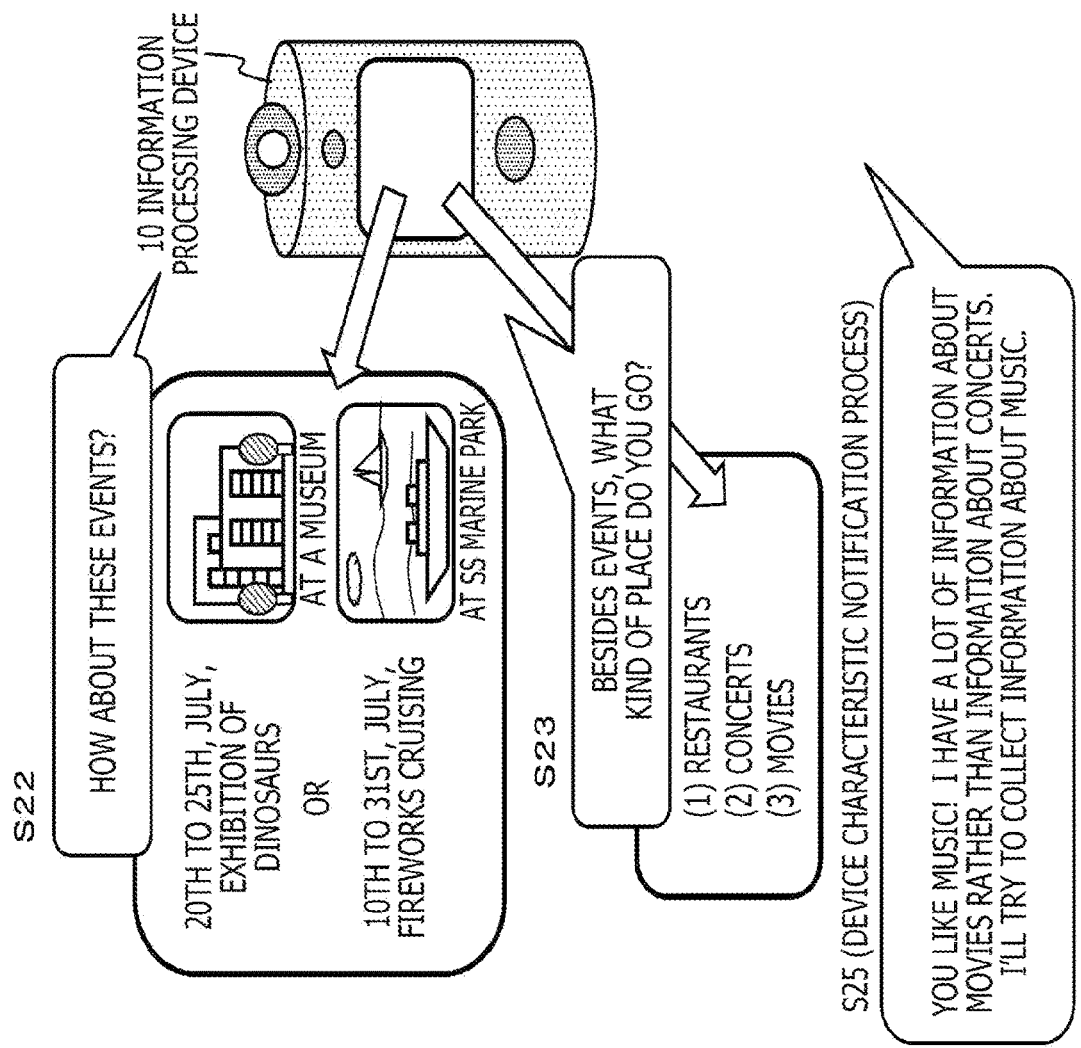
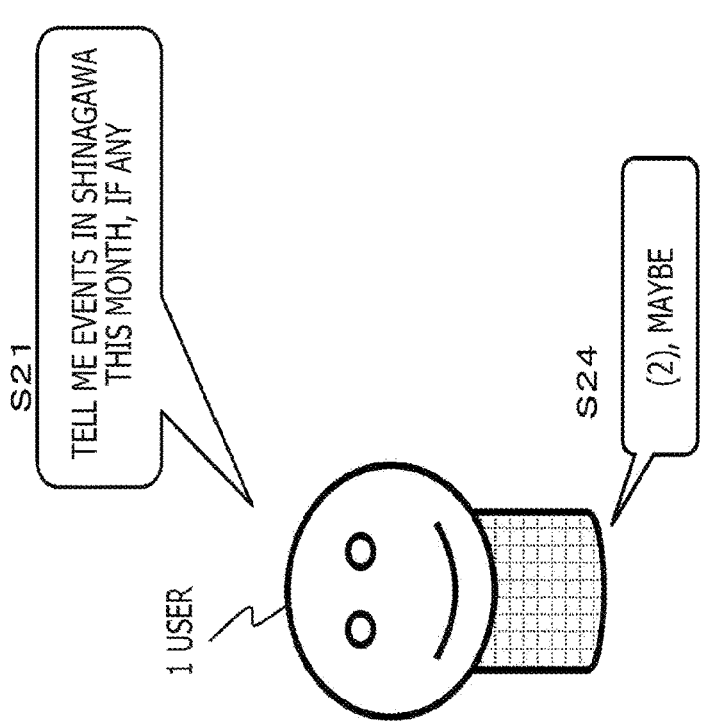

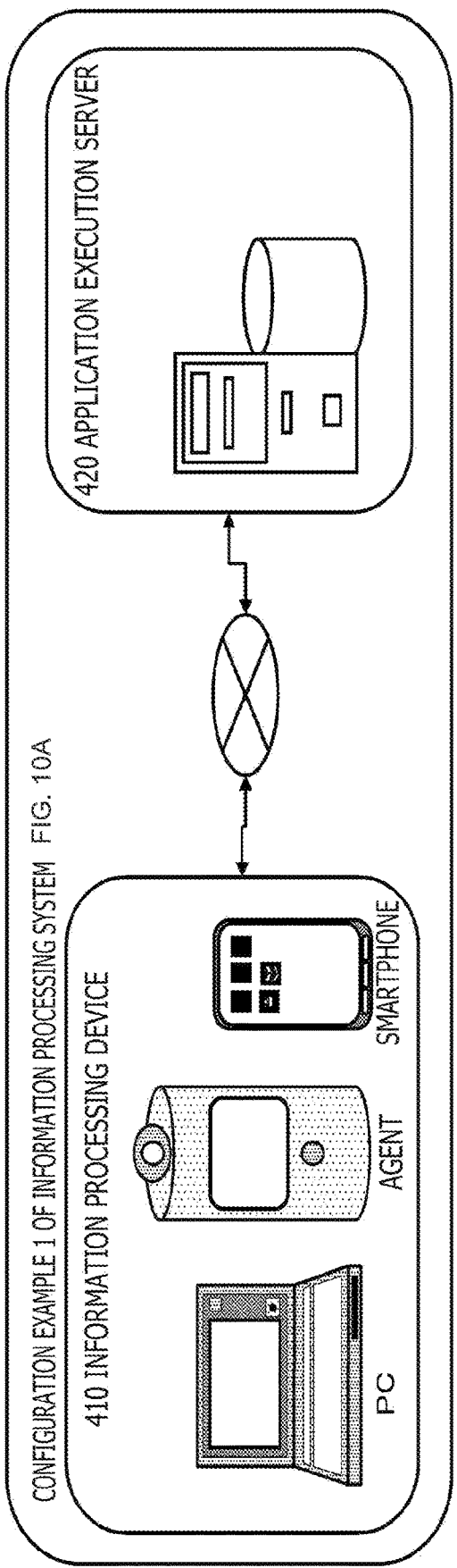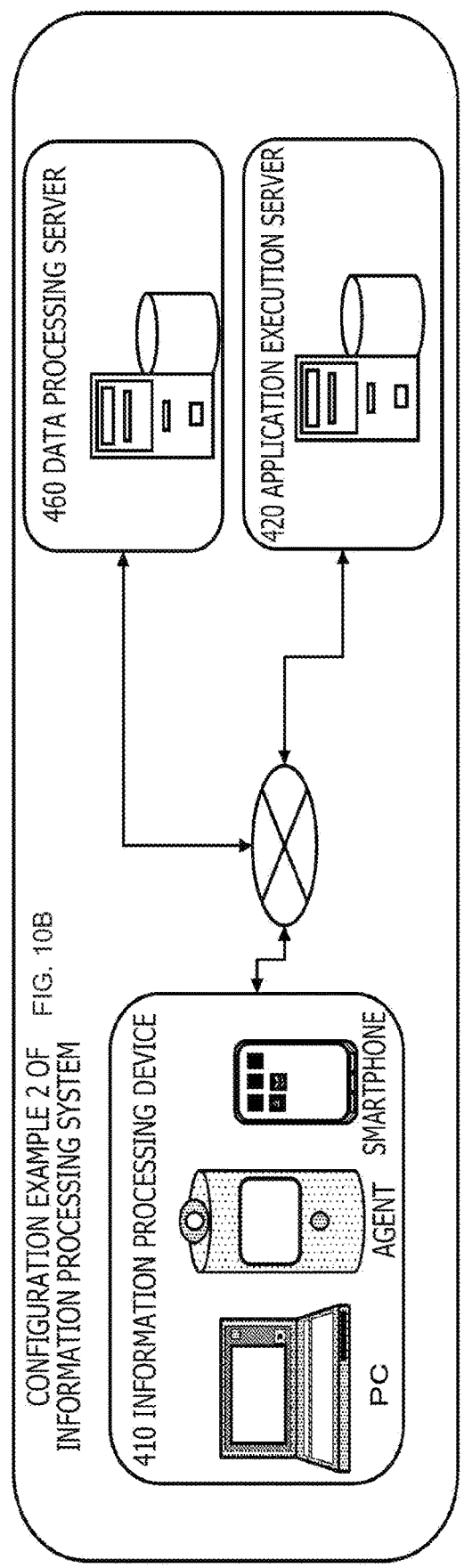

INFORMATION PROCESSING DEVICE, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2019/021305 filed on May 29, 2019, which claims priority benefit of Japanese Patent Application No. JP 2018-136671 filed in the Japan Patent Office on Jul. 20, 2018. Each of the above-referenced applications is hereby incorporated herein by reference in its entirety.

TECHNICAL FIELD

The present disclosure relates to an information processing device, an information processing system, an information processing method, and a program. More specifically, the present disclosure relates to an information processing device, an information processing system, an information processing method, and a program for performing processes and making responses based on a voice recognition result of a user speech.

BACKGROUND ART

Use of voice recognition systems for performing voice recognition of user speeches and performing various processes and making various responses based on recognition results is recently increasing.

Such a voice recognition system recognizes and understands a user speech that is inputted through a microphone, and performs a process according to the speech.

For example, in a case where a user makes a speech: "what is the weather tomorrow?" weather information is acquired from a weather information providing server, a system response based on the acquired information is generated, and the generated response is outputted through a loudspeaker. Specifically, system speech="It will be fine tomorrow, but there will probably a thunder shower in the evening" is outputted, for example.

A device that makes conversation with a user by performing voice recognition of a user speech in the above-described manner is called an agent device, a smart speaker, or the like. Use of such devices is recently increasing.

However, such an agent device is manufactured under various manufacturer's intensions regarding production or specifications, technical restrictions, or various restrictions such as usable applications or usable databases. Thus, agent devices have different characteristics.

For example, an agent device A's specialty is providing music information while an agent device B's specialty is providing cooking information. Agent devices have different characteristics according to the types thereof.

To transmit characteristics of each agent device to users, explanation information such as an instruction manual attached to the agent device, or an explanation video or promotion video that is outputted through the agent device is used. However, a user may fail to confirm the explanation information. Most users use agent devices without having any knowledge about the characteristics of agent devices.

It is to be noted that, for example, PTL 1 (Japanese Patent Laid-Open No. 2007-133728) is a conventional technology which discloses a configuration of changing a characteristic of an agent device according to the personality of a user. PTL 1 discloses a configuration in which an agent device makes a plurality of inquiries to a user, analyzes user's responses to the inquires, infers the personality of the user, and changes a characteristic of the agent device according to the inference result.

However, in the configuration disclosed in the above literature, control is performed to change a reaction to a user by changing a characteristic of an agent device according to the personality of the user. A device characteristic notification process of transmitting a specialty field of an agent to a user, as described above, is not performed.

CITATION LIST

Patent Literature

[PTL 1]
Japanese Patent Laid-Open No. 2007-133728

SUMMARY

Technical Problem

The present disclosure has been made in view of the above problems, for example, and an object thereof is to provide an information processing device, an information processing system, an information processing method, and a program for enabling notification of a characteristic of an agent device to a user through a natural interaction.

Solution to Problem

A first aspect of the present disclosure is an information processing device including
 a data processing section that generates and outputs a system speech including device characteristic information, in which
 the data processing section selects device characteristic information that is relevant to what is talked about during an interaction between a user and the information processing device, and generates and outputs a system speech including the selected device characteristic information.

Moreover, a second aspect of the present disclosure is an information processing system including
 a user terminal, and
 a data processing server, in which
 the user terminal includes
  a voice input section that receives an input of a user speech, and
  a voice output section that outputs a system speech generated by the data processing server, and
 the data processing server generates a system speech, outputs the system speech to the user terminal, and further, selects and outputs system characteristic information that is relevant to what is talked about during an interaction between a user and the user terminal.

Furthermore, a third aspect of the present disclosure is an information processing method that is executed by an information processing device, in which
 the information processing device includes a data processing section that generates and outputs a system speech including device characteristic information, and
 the data processing section selects device characteristic information that is relevant to what is talked about during an interaction between a user and the information processing device, and generates and outputs a system speech including the selected device characteristic information.

Furthermore, a fourth aspect of the present disclosure is an information processing method that is executed by an information processing system including a user terminal and a data processing server, in which the user terminal receives an input of a user speech through a voice input section, and transmits the user speech to the data processing server, and the data processing server generates a system speech, outputs the system speech to the user terminal, and further, selects and outputs system characteristic information that is relevant to what is talked about during an interaction between a user and the user terminal.

Furthermore, a fifth aspect of the present disclosure is a program for causing an information processing device to execute information processing, in which the information processing device includes a data processing section that generates and outputs a system speech including device characteristic information, and the program causes the data processing section to select device characteristic information that is relevant to what is talked about during an interaction between a user and the information processing device, and to generate and output a system speech including the selected device characteristic information.

It is to be noted that the program according to the present disclosure can be provided by a storage medium or communication medium for providing the program in a computer readable format to an information processing device or computer system that is capable of executing various program codes, for example. Since the program is provided in a computer readable format, processing in accordance with the program can be executed on the information processing device or the computer system.

Other objects, features, and advantageous effects of the present disclosure will become apparent from the detailed description based on embodiments of the present disclosure and attached drawings which are described later. It is to be noted that, in the present description, a system refers to a logical set structure including a plurality of devices, and the devices in the structure are not necessarily included in the same casing.

Advantageous Effects of Invention

According to a configuration according to one embodiment of the present disclosure, a system speech including a device characteristic is naturally generated and outputted during an interaction with a user, so that the device characteristic can be reliably notified to the user.

Specifically, for example, the configuration includes a data processing section that generates and outputs a system speech including device characteristic information. The data processing section selects device characteristic information that is relevant to an interaction between a user and the information processing device, and generates and outputs a system speech including the selected device characteristic information. The data processing section receives an input of information of a user selection made to options presented to the user, includes device characteristic information that is relevant to the inputted selection information into a system speech to be executed in an interaction with the user, and outputs the system speech.

Accordingly, a configuration of being able to reliably notify a device characteristic to a user by naturally generating and outputting a system speech including the device characteristic during an interaction with the user, can be implemented.

It is to be noted that the effects described in the present description are just examples, and thus, are not limited. In addition, any additional effect may be provided.

BRIEF DESCRIPTION OF DRAWINGS

FIG. 6 is an explanatory diagram of an outline of processing which is executed by the information processing device according to the present disclosure.

FIGS. 10A and 10B are explanatory diagrams of a configuration example of an information processing system.

DESCRIPTION OF EMBODIMENTS

Figure 1:
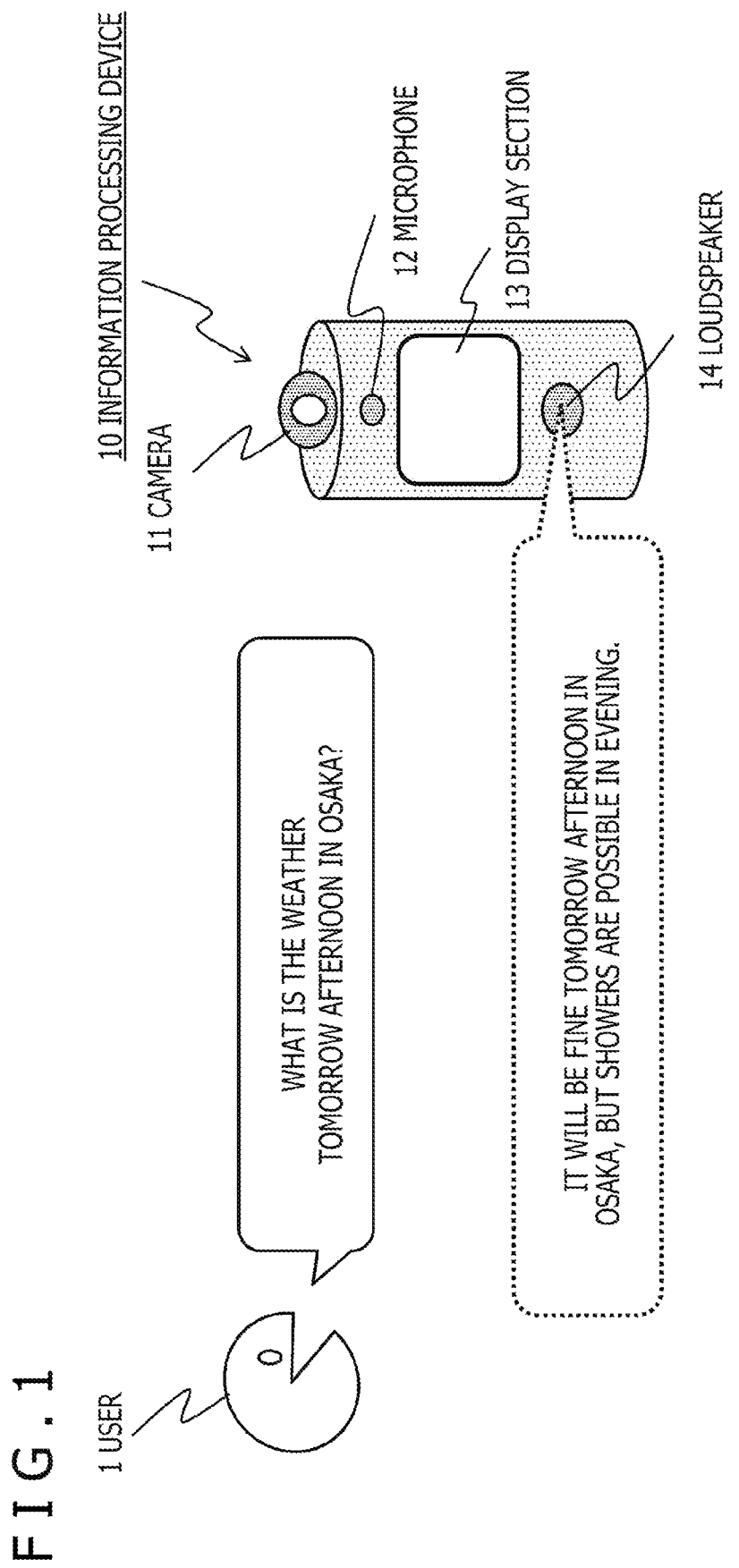
FIG. 1 is an explanatory diagram of a specific processing example in an information processing device that makes a response to a user speech.

Hereinafter, an information processing device, an information processing system, an information processing method, and a program according to the present disclosure will be explained in detail with reference to the drawings. It is to be noted that the explanation will be given in the following order.

1. Outline of processing which is executed by information processing device
2. Configuration example of information processing device
3. Specific processing example of notifying device characteristic information to user
3-1. (First Embodiment) Embodiment of notifying device characteristic information according to user response that is made in response to inquiry from information processing device (agent device) 10
3-2. (Second Embodiment) Embodiment of notifying device characteristic information to follow response (system response) that is made in response to process request to information processing device (agent device) 10 from user
4. Processing for converging opinions of plurality of users 5. Other examples of processes and functions which are executed by information processing device
6. Configuration example of information processing device and information processing system
7. Hardware configuration example of information processing device
8. Conclusion of configurations according to present disclosure

1. Outline of Processing which is Executed by Information Processing Device

First, an outline of processing which is executed by an information processing device according to the present disclosure will be explained with reference to FIG. 1 and subsequent figures.

FIG. 1 is a diagram depicting one processing example of an information processing device 10 that recognizes a user speech made by a user 1 and makes a response.

The information processing device 10 executes voice recognition of
    user speech="What is the weather tomorrow afternoon in Osaka?" for example.

Moreover, the information processing device 10 executes processing based on the voice recognition result of the user speech.

In the example in FIG. 1, data for responding to the user speech="What is the weather tomorrow afternoon in Osaka?" is acquired, a response is generated on the basis of the acquired data, and the generated response is outputted through a loudspeaker 14.

In the example in FIG. 1, the information processing device 10 makes
    system response="It will be fine tomorrow afternoon in Osaka but showers are possible in the evening."

The information processing device 10 executes a voice synthesis process (TTS: Text To Speech) to generate and output the above system response.

The information processing device 10 generates and outputs a response by using knowledge data acquired from a storage section in the device or knowledge data acquired via a network.

The information processing device 10 depicted in FIG. 1 includes a camera 11, a microphone 12, a display section 13, and the loudspeaker 14, and is able to input and output voices and images.

The information processing device 10 depicted in FIG. 1 is called a smart speaker or an agent device, for example.

Figure 2:
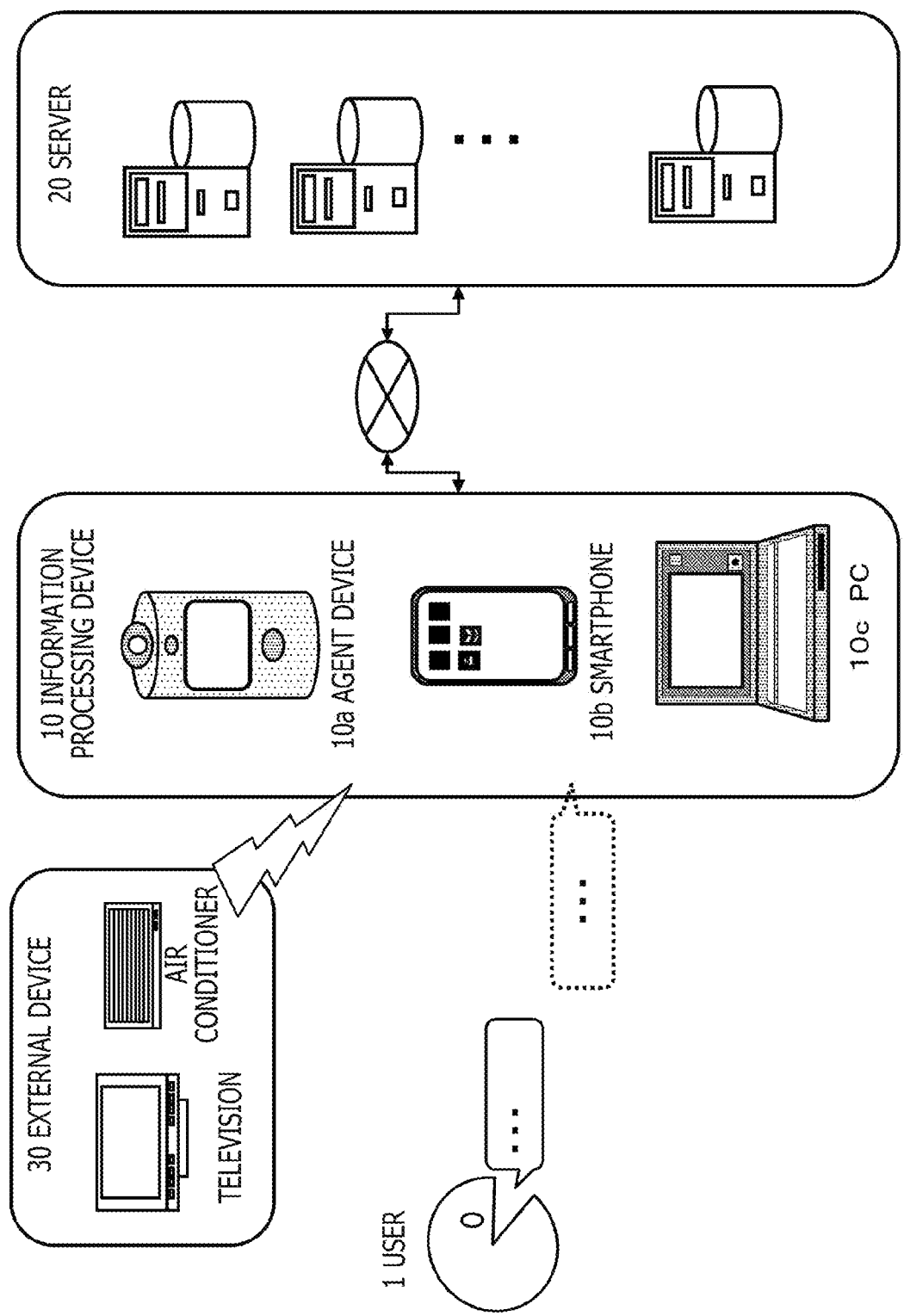
FIG. 2 is an explanatory diagram of a configuration example and a usage example of the information processing device.

The information processing device 10 according to the present disclosure can be formed into various device forms including not only an agent device 10a, but also a smartphone 10b and a PC 10c, as depicted in FIG. 2.

The information processing device 10 recognizes a speech made by the user 1, and makes a response based on the user speech, and further, controls an external device 30 such as a television or an air conditioner depicted in FIG. 2, according to the user speech, for example.

For example, in a case where the user speech is a request: "Set the television to Channel 1" or "Set the temperature of the air conditioner to 20 degrees," the information processing device 10 outputs a control signal (e.g., Wi-Fi, infrared rays) to the external device 30 on the basis of the result of voice recognition of the user speech, and performs control according to the user speech.

It is to be noted that the information processing device 10 is connected to a server 20 via a network and can acquire, from the server 20, information that is necessary to generate a response to a user speech. Alternatively, the server may be caused to execute a voice recognition process or a meaning analysis process.

2. Configuration Example of Information Processing Device

Next, a specific configuration example of the information processing device will be explained with reference to FIG. 3.

Figure 3:
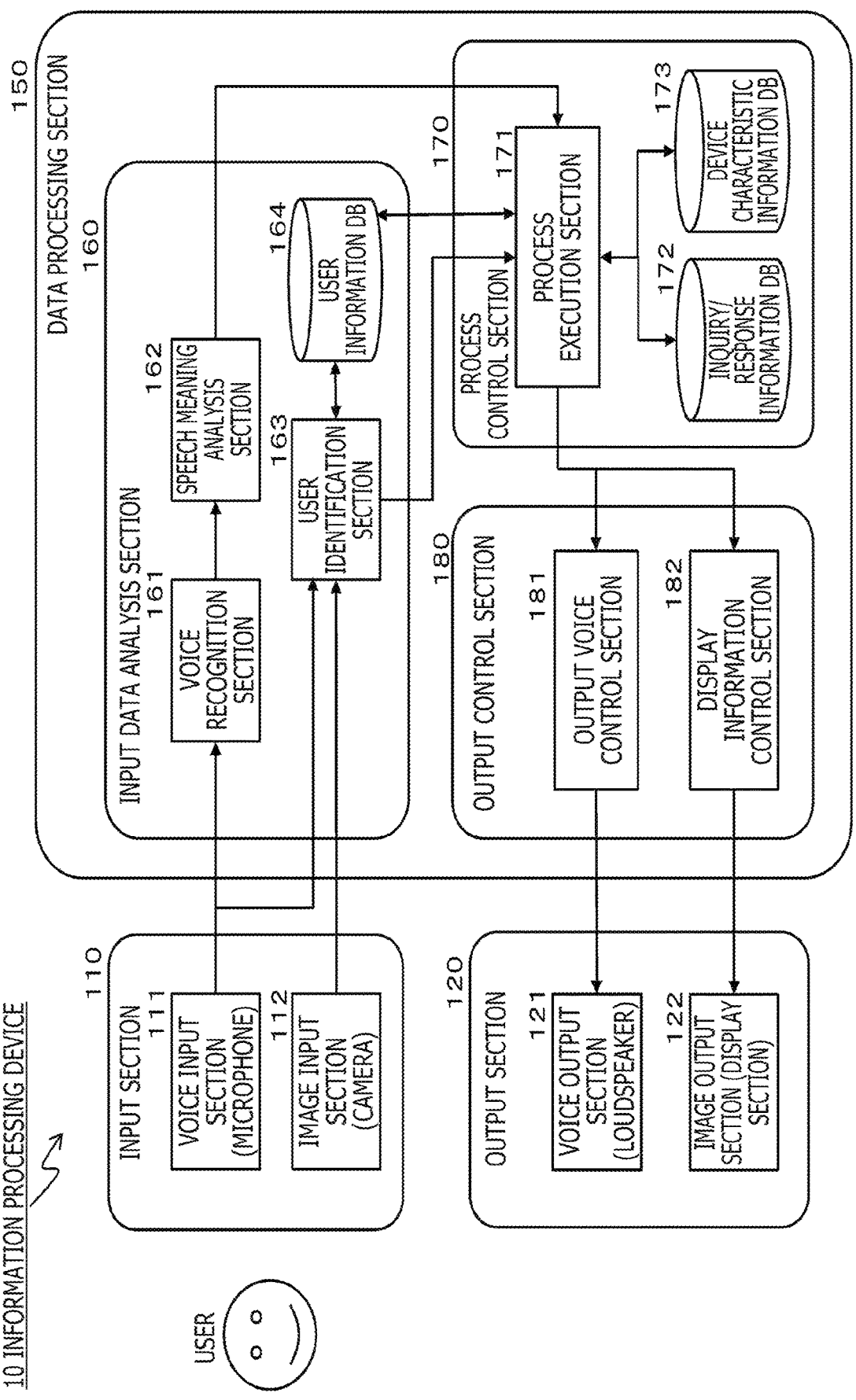
FIG. 3 is an explanatory diagram of a configuration example of the information processing device.

FIG. 3 is a diagram depicting one configuration example of the information processing device 10 that recognizes a user speech and makes a response.

As depicted in FIG. 3, the information processing device 10 includes an input section 110, an output section 120, and a data processing section 150.

It is to be noted that the data processing section 150 may be formed in the information processing device 10, or a data processing unit of an external server may be used as the data processing section 150 without forming the data processing section 150 in the information processing device 10. In the case where the server is used, the information processing device 10 transmits input data inputted through the input section 110, to the server via a network, receives a process result from the data processing section 150 in the server, and outputs the result through the output section 120.

Next, components of the information processing device 10 depicted in FIG. 3 will be explained.

The input section 110 includes a voice input section (microphone) 111 and an image input section (camera) 112.

The output section 120 includes a voice output section (loudspeaker) 121 and an image output section (display section) 122.

The information processing device 10 includes at least the above components.

The voice input section (microphone) 111 corresponds to the microphone 12 of the information processing device 10 depicted in FIG. 1.

The image capturing section 112 corresponds to the camera 11 of the information processing device 10 depicted in FIG. 1.

The voice output section (loudspeaker) 121 corresponds to the loudspeaker 14 of the information processing device 10 depicted in FIG. 1.

The image output section (display section) 122 corresponds to the display section 13 of the information processing device 10 depicted in FIG. 1.

It is to be noted that the image output section (display section) 122 can include a projector or a display such as a liquid crystal display section, for example. Alternatively, a configuration using a display section of a television which is an external device may be used as the image output section (display section) 122.

As previously described, the data processing section 150 is formed in the information processing device 10 or in a server that is capable of communicating with the information processing device 10.

The data processing section 150 includes an input data analysis section 160, a process control section 170, and an output control section 180.

The input data analysis section 160 includes a voice recognition section 161, a speech meaning analysis section 162, a user identification section 163, and a user information DB (database) 164.

A user speech voice is inputted to the voice input section 111.

The voice input section (microphone) 111 inputs the inputted user speech voice to the voice recognition section 161, and further, inputs the inputted user speech voice to the user identification section 163.

The voice recognition section 161 has an ASR (Automatic Speech Recognition) function, for example, and converts the voice data to text data including a plurality of words.

The text data generated by the voice recognition section 161 is inputted to the speech meaning analysis section 162.

The speech meaning analysis section 162 selects and outputs a user's intention candidate included in the text.

The speech meaning analysis section 162 has a natural language understanding function such as NLU (Natural Language Understanding), for example, and infers, from the text data, a user speech intent (Intent) or entity information (Entity) which is an element (meaningful element) having a meaning included in a speech.

If an intent (Entity) and entity information (Entity) are properly inferred and acquired from a user speech, the information processing device 10 can execute proper processing on the user speech.

The intent (Intent) of the user speech and the entity information (Entity) obtained by analysis at the speech meaning analysis section 162 are inputted to a process execution section 171 of the process control section 170.

In addition, the user identification section 163 of the input data analysis section 160 receives an input of voice information of a user speech from the voice input section (microphone) 111, and further, receives an input of a camera photograph image from the image input section (camera) 112.

On the basis of the inputted information, the user identification section 163 identifies a user who is in front of the information processing device 10.

User information of a previously registered user is stored in the user information DB 164. Specifically, a face image, face feature information, voice information, and other attribute information such as age and sex, are recorded in association with a user identifier (user ID).

In addition, inquiries and options having been presented from the information processing device 10 to each user, response information having been inputted from the user, device characteristic information having been notified to the user, or identifiers of the information are registered, in association with a corresponding user ID, in the user information DB 164.

The user identification section 163 identifies a user who has made a speech to the information processing device 10 or a user who is in front of the information processing device 10 by comparing and verifying the information inputted from the input section 110 with information registered in the user information DB 164.

However, not all users need to be registered previously in the user information DB 164. For example, in a case where a user who has not been registered in the user information DB 164 is detected from a photograph image from the image input section (camera) 112, the user identification section 163 registers the new user in association with a new user ID, together with a face image and position information, in the user information DB 164. The registered information is used to execute the subsequent processing.

User identification information which is an analysis result obtained by the user identification section 163 is inputted to the process execution section 171 of the process control section 170.

The process control section 170 includes the process execution section 171, an inquiry/response information DB 172, and a device characteristic information DB 173.

The process execution section 171 receives the result of user speech meaning analysis from the speech meaning analysis section 162 of the input data analysis section 160, and further, receives the result of user identification from the user identification section 163.

On the basis of the inputted information, the process execution section 171 can get to know what is spoken by each user to the information processing device 10, for example. For each user, a plurality of user speeches as below can be recognized, for example:

User A's speech=Show me No. 1
User B's speech=I like No. 3

In this manner, the process execution section 171 recognizes a speech for each user.

The process execution section 171 executes processing according to the speech analysis result obtained for each user. For example, processing in response to a user speech request is executed.

Furthermore, the process execution section 171 transmits a characteristic of the information processing device 10 to a user, that is, executes a device characteristic notification process.

The device characteristic notification process which is executed by the process execution section 171 is executed during a natural interaction between a user and the information processing device 10. As a result of transmission of a device characteristic to a user during an interaction between the user and the information processing device 10, the device characteristic can be reliably transmitted to the user.

Device characteristic information that is necessary for the device characteristic notification process which is executed by the process execution section 171 is stored in the device characteristic information DB 173.

Examples of a device characteristic include characteristics of the information processing device 10 of
 (a) having a specialty of providing music information,
 (b) having a specialty of providing cooking information,
 (c) being able to have a conversation in English,
 (d) having a specialty of remembering faces, and
 (e) being unable to identify a user in a dark environment, for example.

Various kinds of device characteristic information such as the above characteristics are stored in the device characteristic information DB 173.

In addition, inquiry and response information to be outputted from the information processing device 10 to a user, option information to be used for inquiries, and the like, are stored in the inquiry/response information DB 172.

In the case of executing the device characteristic notification process, the process execution section 171 acquires device characteristic information stored in the device characteristic information DB 173 and outputs the acquired information as a speech from the information processing device 10, that is, as a system speech through the output section 120. It is to be noted that the output may involve a voice output or may involve an image output.

In addition, during the device characteristic notification process or during a normal interaction, which is not the device characteristic notification process, with a user, inquiry/response information stored in the inquiry/response information DB 172 is acquired, a system speech is generated, and the system speech is outputted through the output section 120. The output may involve a voice output or may involve an image output.

The process execution result obtained by the process execution section 171 is outputted through the output control section 180. The output control section 180 includes an output voice control section 181 and a display information control section 182. The output voice control section 181 generates a system speech to a user on the basis of a process determined by the process execution section. The response voice information generated by the output voice control section 181 is outputted through the voice output section 121 which is a loudspeaker or the like.

The display information control section 182 generates and updates display information of the image output section (display section) 122 on the basis of the result of process execution at the process execution section 171. For example, in a case where a user makes a user speech: Show me a world map, a world map is displayed. In addition, the process execution section 171 of the information processing device 10 displays inquiry or option information acquired from the inquiry/response information DB 172.

3. Specific Processing Example of Notifying Device Characteristic Information to User Next, a specific processing example of notifying device characteristic information to a user will be explained.

As previously described, an agent device is manufactured under various manufacturer's intentions regarding production or specifications, technical restrictions, or various restrictions such as usable applications or databases. Thus, devices have different characteristics.

For example, an agent device A's specialty is providing music information, and an agent device B's specialty is providing cooking information. That is, agent devices have different characteristics according to the types thereof.

As a method for transmitting respective characteristics of agent devices to users, explanation information such as instruction manuals attached to the agent devices or explanation videos or promotion videos that are outputted through the agent devices, can be used. However, a user may fail to confirm such explanation information. Most users use agent devices without having any knowledge about the characteristics of the agent devices.

When using an agent device without having any knowledge about a characteristic of the agent device, a user cannot fully utilize the device. When this state is continued, the user's interest in the agent device may be reduced, and the user may soon quit talking to the agent device. In order to avoid such a situation, it is important to inform a user about characteristics of the agent device such as specialty fields and weakness fields, etc.

The information processing device 10 according to the present disclosure transmits a characteristic of the information processing device 10 to a user while executing an interaction with the user. Since the characteristic is notified to the user during a time period in which the interaction with the user is being executed, the user can reliably recognize the device characteristic.

As specific embodiments of the device characteristic notification process, two embodiments will be explained below.

(First Embodiment) Embodiment of notifying a device characteristic according to a user response that is made in response to an inquiry from the information processing device (agent device) 10

(Second Embodiment) Embodiment of notifying a device characteristic to follow a response (system response) that is made in response to a process request to the information processing device (agent device) 10 from a user Hereinafter, these embodiments will be explained in order.

3-1. (First Embodiment) Embodiment of Notifying Device Characteristic Information According to User Response that is Made in Response to Inquiry from Information Processing Device (Agent Device) 10

First, (First Embodiment) embodiment of notifying device characteristic information according to a user response that is made in response to an inquiry from the information processing device (agent device) 10, will be explained with reference to FIG. 4.

Figure 4:
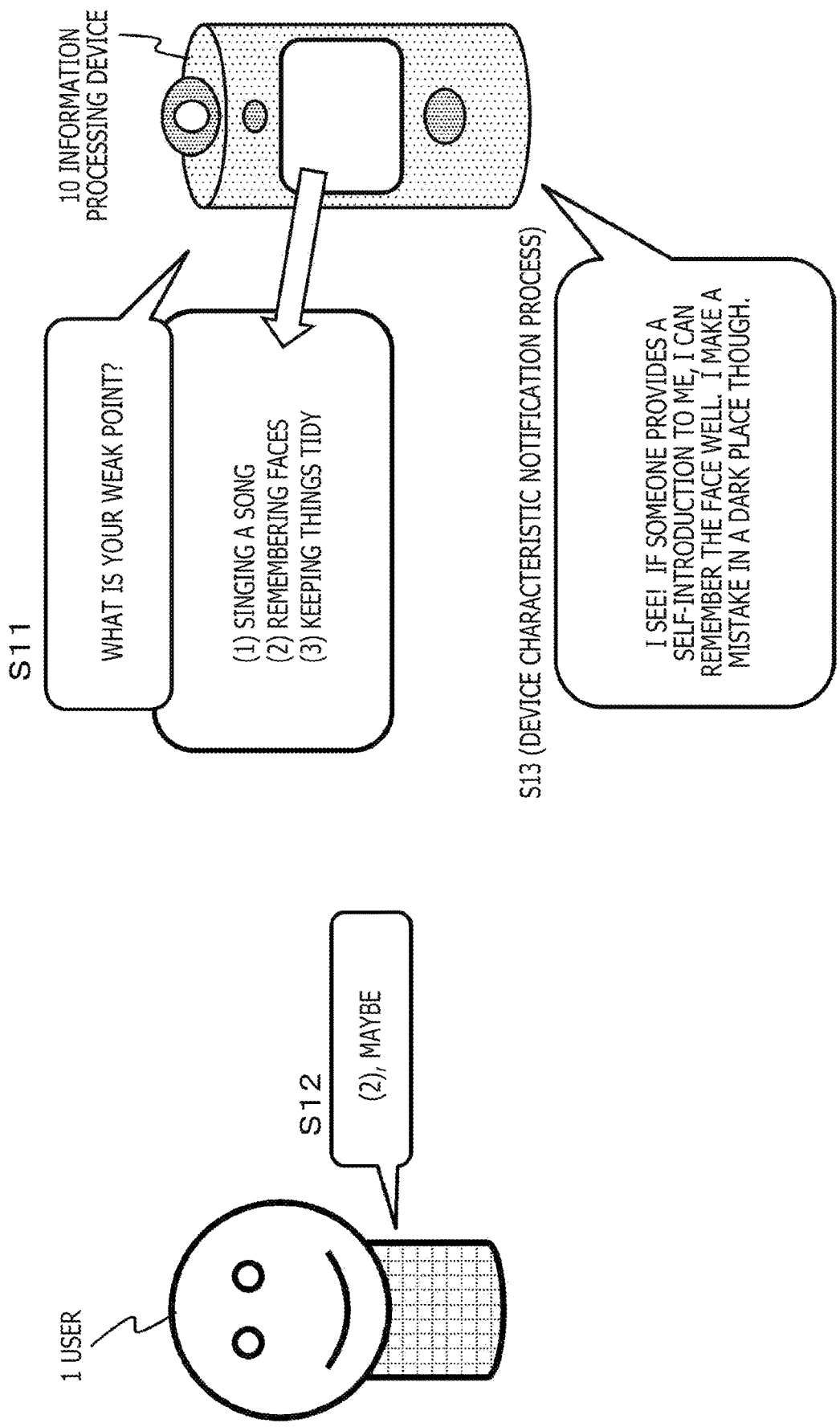
FIG. 4 is an explanatory diagram of an outline of processing which is executed by the information processing device according to the present disclosure.

FIG. 4 depicts the user 1 and the information processing device (agent device) 10.

The user 1 and the information processing device 10 execute interactions by alternately making speeches in the order of steps S11 to S13 in FIG. 4.

(Step S11)

First, at step S11, the information processing device 10 makes:

system speech=What is your weak point?

The information processing device 10 outputs the above system speech through the voice output section (loudspeaker) 121, and further, displays options:

(1) Singing a song
(2) Remembering faces
(3) Keeping things tidy, through the image output section (display section) 122, as depicted in FIG. 4.

The above system speech and option information are a system speech and display information which are generated on the basis of information acquired from the inquiry/response DB 172 by the process execution section 171 of the process control section 170 of the data processing section 150 depicted in FIG. 3.

(Step S12)

In response to the system speech and the display information provided at step S11 by the information processing device 10, the user 1 makes user speech=(2), maybe at step S12.

This indicates the number that the user 1 selects from among:

(1) Singing a song
(2) Remembering faces
(3) Keeping things tidy which are displayed as options on the image output section (display section) 122 by the information processing device 10.

That is, as a response to the information processing device 10, the user 1 makes a response indicating that the weak point of the user 1 is "(2) remembering faces."

(Step S13)

Next, on the basis of the option selected by the user 1 at step S12, that is, selection information indicating that the option "(2) remembering faces" is a weak point, the process execution section 171 of the information processing device 10 makes system speech=I see! If someone provides a self-introduction to me, I can remember the face well. I make a mistake in a dark place though, which is relevant to the selection information.

The system speech is made as a "device characteristic notification process."

The system speech is generated on the basis of device characteristic information stored in the device characteristic DB 173 by the process execution section 171 of the process control section 170 of the data processing section 150 depicted in FIG. 3.

That is, as a result of the above system speech,
a device characteristic=having specialty of remembering faces
is notified to the user 1.

The information processing device 10 according to the present disclosure executes processing of notifying device characteristic information to a user during an interaction with the user, as explained above. As a result of this notification about a characteristic during an interaction, it is possible to reliably cause the user to learn the characteristic.

It is to be noted that various different types of device characteristic information are stored in the device characteristic information DB 173 such that the process execution section 171 selects and acquires, from the device characteristic information DB 173, device characteristic information that is relevant to the last interaction between the information processing device 10 and the user 1, and generates and outputs a system speech for notifying the selected and acquired device characteristic information.

In the example depicted in FIG. 4, on the basis of the selection information indicating that the option selected by the user 1, that is,
"(2) remembering faces" is a weak point,
the process execution section 171 selects device characteristic information that is relevant to the selection information from the device characteristic information DB 173, and outputs the selected device characteristic information as a system speech.

In the above-described manner, the information processing device 10 according to the present disclosure executes processing of selecting device characteristic information that corresponds to a field in which a user expresses interest, and notifying the device characteristic information to the user during a natural interaction between the user and the information processing device 10. The information processing device 10 notifies, at different timings, various device characteristics corresponding to the current interaction to a user, so that it is possible to reliably cause the user to learn the characteristics while leaving an impression.

It is to be noted that inquiries and options presented to each user by the process execution section 171 of the information processing device 10, response information inputted from each user, and device characteristic information notified to each user are recorded, in association with the corresponding user ID, in the user information DB 164. It is to be noted that, instead of inquiries and options, response information, or device characteristic information, identifiers of these data are recorded, in association with the corresponding user ID, in the user information DB 164.

With reference to a flowchart depicted in FIG. 5, an explanation will be given of a process sequence which is executed by the information processing device 10 when the processing previously explained with reference to FIG. 4, that is, the processing of notifying a device characteristic according to a user response that is made in response to an inquiry from the information processing device (agent device) 10 is executed.

Figure 5:
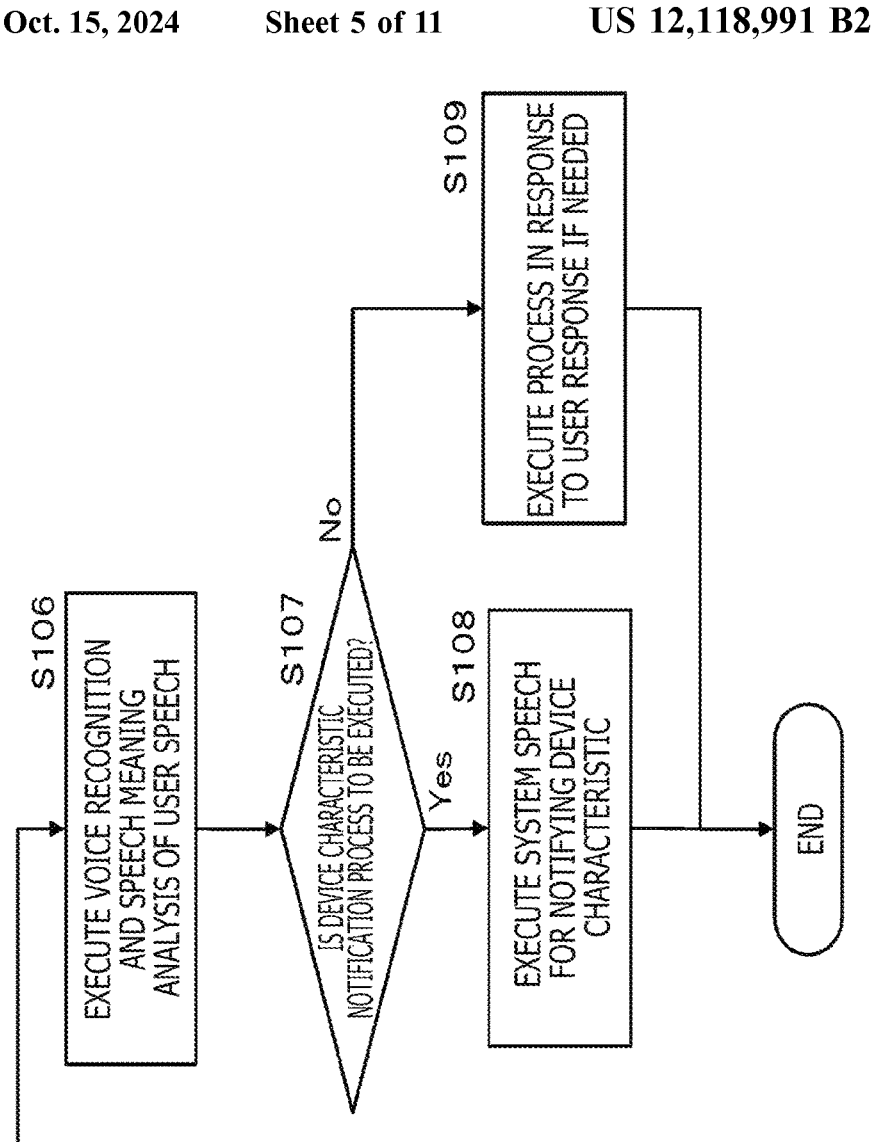
FIG. 5 is a flowchart for explaining a process sequence which is executed by the information processing device according to the present disclosure.

It is to be noted that processes based on the flowchart depicted in FIG. 5 can be executed in accordance with a program stored in a storage section of the information processing device 10, and can be executed under control of a control section (data processing section) included in a processor such as a CPU having a program executing function, for example.

Hereinafter, steps of the flow depicted in FIG. 5 will be explained.

(Step S101)

First, at step S101, the information processing device 10 executes a user detection process.

This process is executed at the user identification section 163 of the input data analysis section 160 depicted in FIG. 3.

As previously described, the user identification section 163 receives an input of voice information of a user speech from the voice input section (microphone) 111, and further, receives an input of a camera photograph image from the image input section (camera) 112. On the basis of the inputted information, the user identification section 163 determines whether or not any user is in front of the information processing device 10.

(Step S102)

In a case where it is determined at step S102 that a user who is in front of the information processing device 10 has been detected, the sequence proceeds to step S103. In a case where any user has not been detected, the sequence returns to step S101 to continue the user detection process.

(Step S103)

In a case where it is determined at step S102 that a user who is in front of the information processing device 10 has been detected, the sequence proceeds to step S103. At step S103, a user identification process is executed.

This process is also executed by the user identification section 163. The user identification section 163 receives voice information of the user speech from the voice input section (microphone) 111, and further, receives the camera photograph image from the image input section (camera) 112. On the basis of the inputted information, the user identification section 163 identifies the user who is in front of the information processing device 10.

(Step S104)

Next, at step S104, the information processing device 10 outputs a system speech to the user. This system speech includes a greeting that is previously set so as to be executed on a regular basis, an inquiry that is previously set in the information processing device 10, or the like. This system speech corresponds to the system speech at step S11 having been explained with reference to FIG. 4.

That is, for example,
system speech=What is your weak point?
is executed.

The information processing device 10 outputs the above system speech through the voice output section (loudspeaker) 121, and displays options:
   (1) Singing a song
   (2) Remembering faces
   (3) Keeping things tidy,
through the image output section (display section) 122, as depicted in the drawing.

As previously explained, the above system speech and option information are a system speech and display information that are generated on the basis of the information acquired from the inquiry/response DB 172 by the process execution section 171 of the process control section 170 of the data processing section 150 depicted in FIG. 3.

It is to be noted that the above inquiry is previously stored in the inquiry/response DB 172 of the information processing device 10, and the process execution section 171 is set to sequentially execute inquires that have not been executed yet to the user, inquires for which responses have not been obtained yet from the user, and the like.
(Step S105)

Next, at step S105, the information processing device 10 executes a process of acquiring (waiting for) a response from the user. In a case where a user response is acquired, the sequence proceeds to step S106. In a case where no user response is acquired within a prescribed waiting time period, the sequence returns to step S101 to continue the user detection process.
(Step S106)

In a case where a user response is acquired within the prescribed waiting time period at step S105, the sequence proceeds to step S106. At step S106, voice recognition and speech meaning analysis of the user response are executed.

This step is executed at the voice recognition section 161 and the speech meaning analysis section 162 of the input data analysis section 160 depicted in FIG. 3.

The result of the user speech meaning analysis executed at the speech meaning analysis section 162 is inputted to the process execution section 171 of the process control section 170.
(Step S107)

Next, at step S107, the process execution section 171 determines whether or not to execute a device characteristic notification process, on the basis of the result of the user speech meaning analysis inputted from the speech meaning analysis section 162.

For example, in a case where the user response indicates a new process request to the device, the process request is preferentially executed. Thus, not the device characteristic notification process but a responding process to the user's request is executed.

In this case, the process execution section 171 determines to refrain from executing the device characteristic notification process (determination at Step S107=No), and then, the sequence proceeds to step S109.

On the other hand, for example, in a case where the user response indicates not a new process request or the like to the device but a response to the system speech executed at step S104, the device characteristic notification process is executed.

In this case, the process execution section 171 determines to execute the device characteristic notification process (determination at Step S107=Yes), and then, the sequence proceeds to step S108.
(Step S108)

In a case where execution of the device characteristic notification process is determined at step S107, the sequence proceeds to step S108.

At step S108, the process execution section 171 executes a system speech for notifying a device characteristic.

The process execution section 171 acquires device characteristic information that is relevant to the current interaction with the user 1, from device characteristic information stored in the device characteristic information DB 173, and generates and outputs a system speech for notifying the acquired device characteristic information.

The system speech for notifying the device characteristic information corresponds to the system speech at step S13 in the example having been explained with reference to FIG. 4, that is,
system speech=I see! If someone provides a self-introduction to me, I can remember the face well. I make a mistake in a dark place though.

It is to be noted that various different types of device characteristic information are stored in the device characteristic information DB 173 such that the process execution section 171 selects and acquires, from the device characteristic information DB 173, device characteristic information that is relevant to the last interaction between the information processing device 10 and the user 1, and generates and outputs a system speech for notifying the selected and acquired device characteristic information.

Specifically, as previously explained with reference to FIG. 4, the information processing device 10 selects, from the device characteristic information DB 173, device characteristic information that is relevant to an option selected by the user from among options presented to the user, for example, and outputs the selected device characteristic information as a system speech.

The information processing device 10 according to the present disclosure selects and notifies device characteristic information that corresponds to a field in which a user expresses interest, during a natural interaction between the user and the information processing device 10 in the above-described manner, so that it is possible to reliably cause the user to learn the device characteristic while leaving an impression.
(Step S109)

On the other hand, in a case where to refrain from executing the device characteristic notification process is determined at step S107, the sequence proceeds to step S109.

At step S109, the process execution section 171 executes a process in response to the user response including a request to the information processing device 10 or the like, for example, if needed.

By executing the processes according to the flow depicted in FIG. 5, the information processing device 10 can transmit a characteristic of the information processing device 10 to the user 1 during a natural interaction. Accordingly, the user 1 can naturally learn a device characteristic that is relevant to what is talked about during the interaction.

3-2. (Second Embodiment) Embodiment of
Notifying Device Characteristic Information to
Follow Response (System Response) that is Made
in Response to Process Request to Information
Processing Device (Agent Device) 10 from User Next, (Second Embodiment) Embodiment of notifying device characteristic information to follow a response (system response) that is made in response to a process request to the information processing device (agent device) 10 from a user, will be explained with reference to FIG. 6.

Like FIG. 4, FIG. 6 also depicts the user 1 and the information processing device (agent device) 10.

The user 1 and the information processing device 10 execute interactions by alternately making speeches in the order of steps S21 to S25 which are depicted in FIG. 6.
(Step S21)

First, at step S21, the user 1 makes
user speech=Tell me events in Shinagawa this month, if any.

The information processing device 10 executes voice recognition and speech meaning analysis of the user speech. The result of the analysis is inputted to the process execution section 171.

(Step S22)

Next, in response to the "user speech=Tell me events in Shinagawa this month, if any" inputted at step S12, the information processing device 10 makes system speech=How about these events?

The information processing device 10 outputs the above system speech through the voice output section (loudspeaker) 121, and further, displays event information through the image output section (display section) 122, as depicted in FIG. 6.

(Step S23)

In common systems, an interaction sequence is ended after an output of the system speech at step S22. However, the information processing device 10 according to the present disclosure executes system speech=Besides events, what kind of place do you go?

at step S23 to follow the above system speech at step S22.

The information processing device 10 outputs the above system speech through the voice output section (loudspeaker) 121, and further, displays options:

(1) Restaurants
(2) Concerts
(3) Movies, through the image output section (display section) 122, as depicted in FIG. 6.

The above system speech and option information are the system speech and display information generated on the basis of information acquired from the inquiry/response DB 172 by the process execution section 171 of the process control section 170 of the data processing section 150 depicted in FIG. 3.

(Step S24)

In response to the system speech and display information executed at step S23 by the information processing device 10, the user 1 makes user speech=(2), I think, at step S24.

This indicates the number that the user 1 has selected from among the options:

(1) Restaurants
(2) Concerts
(3) Movies which are displayed on the image output section (display section) 122 by the information processing device 10.

That is, the user 1 makes a response indicating that the user often goes to "(2) concerts," as a response to the information processing device 10.

(Step S25)

Next, in response to the "user speech=(2), I think," inputted at step S24, the information processing device 10 makes system speech=You like music! I have a lot of information about movies rather than information about concerts. I'll try to collect information about music.

The above system speech is executed as the "device characteristic notification process."

The above system speech is generated on the basis of device characteristic information stored in the device characteristic DB 173 by the process execution section 171 of the process control section 170 of the data processing section 150 depicted in FIG. 3.

That is, through the system speech, a process of notifying:

device characteristic 1=having a specialty of providing movie information; and device characteristic 2=having no specialty in providing music information, to the user 1 is executed.

The information processing device 10 according to the present disclosure executes processing of notifying device characteristic information to a user while an interaction with the user is being executed, in the above-described manner. As a result of this notification about a characteristic during an interaction, it is possible to reliably cause the user to learn the characteristic.

It is to be noted that, as previously explained, various different device characteristic information is stored in the device characteristic information DB 173 such that the process execution section 171 selects and acquires, from the device characteristic information DB 173, device characteristic information that is relevant to the last interaction between the information processing device 10 and the user 1, and generates and outputs a system speech for notifying the selected and acquired device characteristic information.

In the example in FIG. 6, on the basis of selection information indicating an option selected by the user 1, that is, often going "(2) concerts,"

device characteristic information that is relevant to the selection information is selected from the device characteristic information DB 173, and the selected device characteristic information is outputted as a system speech.

In the above-described manner, the information processing device 10 according to the present disclosure selects device characteristic information that corresponds to a field in which a user expresses interest, and notifies the device characteristic information to the user during a natural interaction between the user and the information processing device 10. The information processing device 10 notifies, at different timings, various device characteristics corresponding to the current interaction to a user, so that it is possible to reliably cause the user to learn the characteristics while leaving an impression.

It is to be noted that inquiries and options having been presented to each user by the process execution section 171 of the information processing device 10, response information having been inputted from each user, and device characteristic information having been notified to each user, are registered, in association with the corresponding user ID, in the user information DB 164. It is to be noted that, instead of the inquiries and options, the response information, or the device characteristic information, identifiers of these data may be recorded, in association with the corresponding user ID, in the user information DB 164.

A process sequence which is executed by the information processing device 10 when the processing having been explained with reference to FIG. 6, that is, the processing of notifying a device characteristic to follow a response (system response) that is made in response to a process request to the information processing device (agent device) 10 from a user is executed, will be explained with reference to a flowchart depicted in FIG. 7.

Figure 7:
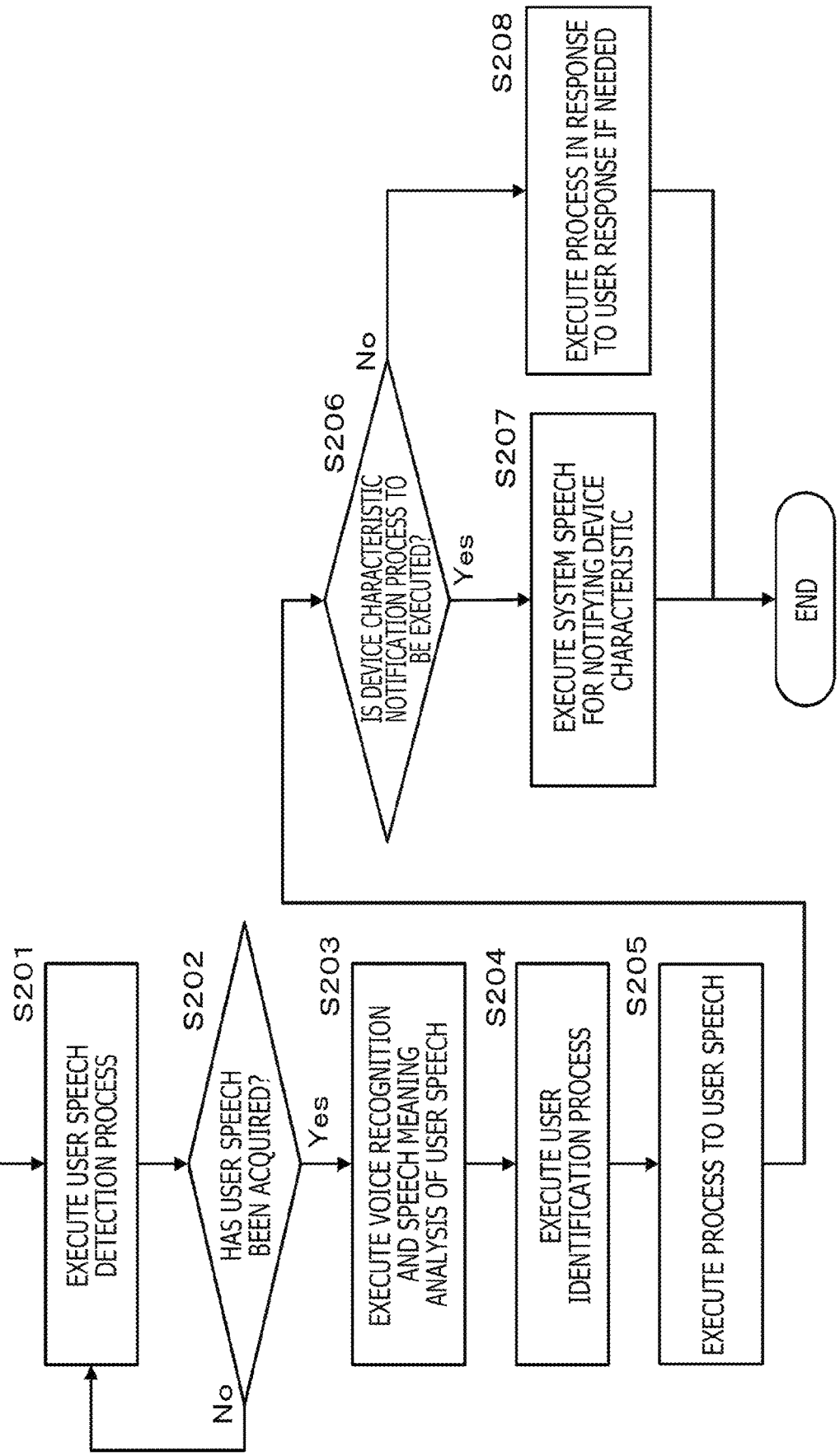
FIG. 7 is a flowchart for explaining a process sequence which is executed by the information processing device according to the present disclosure.

It is to be noted that processes based on the flowchart depicted in FIG. 7 can be executed in accordance with a program stored in a storage section of the information processing device 10, and can be executed under control of a control section (data processing section) included in a processor such as a CPU having a program executing function, for example.

Hereinafter, steps of the flow depicted in FIG. 7 will be explained.

(Step S201)

First, at step S201, the information processing device 10 executes a user speech detection process.

This process is executed at the voice recognition section 161 of the input data analysis section 160 depicted in FIG. 3.

(Step S202)

Next, at step S202, the voice recognition section 161 determines whether or not a user speech has been detected. In a case where a user speech has been detected, the sequence proceeds to step S203. In a case where no user speech has been detected, the sequence returns to step S201 to continue the user speech detection process.

(Step S203)

In a case where a user speech has been detected at step S202, the sequence proceeds to step S203. At step S203, voice recognition and speech meaning analysis of the user speech are executed.

This process is executed at the voice recognition section 161 and the speech meaning analysis section 162 of the input data analysis section 160 depicted in FIG. 3.

The result of the user speech meaning analysis executed by the speech meaning analysis section 162 is inputted to the process execution section 171 of the process control section 170.

(Step S204)

Next, at step S204, a user identification process for a user who has made the user speech is executed.

This process is executed by the user identification section 163. The user identification section 163 receives an input of voice information of the user speech from the voice input section (microphone) 111, and further, receives an input of a camera photograph image from the image input section (camera) 112. On the basis of the inputted information, the user identification section 163 identifies a user who has made the user speech.

(Step S205)

Next, at step S205, the information processing device 10 executes a response process to the user speech on which the speech meaning analysis has been executed at step S203.

This process corresponds to step S22 of the processing having been explained with reference to FIG. 6, for example.

That is, this process is a response process to the user speech at step S21 which is a request from the user 1 to the information processing device 10.

(Step S206)

Next, at step S206, the process execution section 171 determines whether or not to execute a device characteristic notification process.

For example, in a case where a user makes a user speech indicating a new process request to the device within a prescribed time period, the process request is preferentially executed. Thus, not the device characteristic notification process but a response process to the user request is executed.

In this case, the process execution section 171 determines to refrain from executing the device characteristic notification process (determination at Step S206=No), and then, the sequence proceeds to step S208.

On the other hand, for example, in a case where the user has not made a user speech indicating a new process request to the device within the prescribed time period, the device characteristic notification process is executed.

In this case, the process execution section 171 determines to execute the device characteristic notification process (determination at Step S206=Yes), and then, the sequence proceeds to step S207.

(Step S207)

In a case where it is determined at step S206 to execute the device characteristic notification process, the sequence proceeds to step S207.

At step S207, the process execution section 171 executes a system speech for notifying a device characteristic.

The process execution section 171 acquires device characteristic information that is relevant to the current interaction with the user 1 from the device characteristic information stored in the device characteristic information DB 173, and generates and outputs a system speech for notifying the acquired device characteristic information.

The system speech for notifying the above device characteristic information corresponds to the system speech at step S23 in the example having been explained with reference to FIG. 6, that is, system speech=Besides events, what kind of place do you go?

It is to be noted that various different device characteristic information is stored in the device characteristic information DB 173 such that the process execution section 171 selects and acquires, from the device characteristic information DB 173, device characteristic information that is relevant to the last interaction between the information processing device 10 and the user 1, and generates and outputs a system speech for notifying the selected and acquired device characteristic information.

The information processing device 10 according to the present disclosure selects and notifies device characteristic information that corresponds to a field in which a user expresses an interest during a natural interaction between the user and the information processing device 10, in the above-described manner, so that it is possible to reliably cause the user to learn the device characteristic while leaving an impression.

(Step S208)

On the other hand, in a case where it is determined at step S206 to refrain from executing the device characteristic notification process, the sequence proceeds to step S208.

At step S208, the process execution section 171 executes a process in response to a user response such as a request to the information processing device 10, for example, if needed.

By executing the processes based on the flow depicted in FIG. 7, the information processing device 10 can transmit a characteristic of the information processing device 10 to the user 1 during a natural interaction. Accordingly, it is possible to cause the user 1 to naturally learn a device characteristic that is relevant to what is talked about during the interaction.

4. Processing for Converging Opinions of Plurality of Users

Next, processing which is executed by the information processing device 10 to converge opinions of a plurality of users in a case where the plurality of users is in front of the information processing device 10 and make respective various speeches.

As previously explained, the information processing device 10 executes the device characteristic notification process during an interaction with a user. However, what type of a device characteristic is to be notified to the user is determined by the process execution section 171 of the information processing device 10 according to what is talked about during the interaction with the user.

Specifically, as previously explained with reference to FIGS. 4 and 6, the information processing device 10 notifies device characteristic information that is relevant to an option that the user has selected from among a plurality of options presented to the user.

However, in a case where a plurality of users is in front of the information processing device 10, for example, the plurality of users may select different options from among a plurality of options presented by the information processing device 10 to the users. In this case, it is difficult for the information processing device to select device characteristic information to be notified to the users. In order to solve this problem, the information processing device 10 executes processing for converging opinions of the plurality of users.

A specific example thereof will be explained with reference to FIG. 8.

Figure 8:
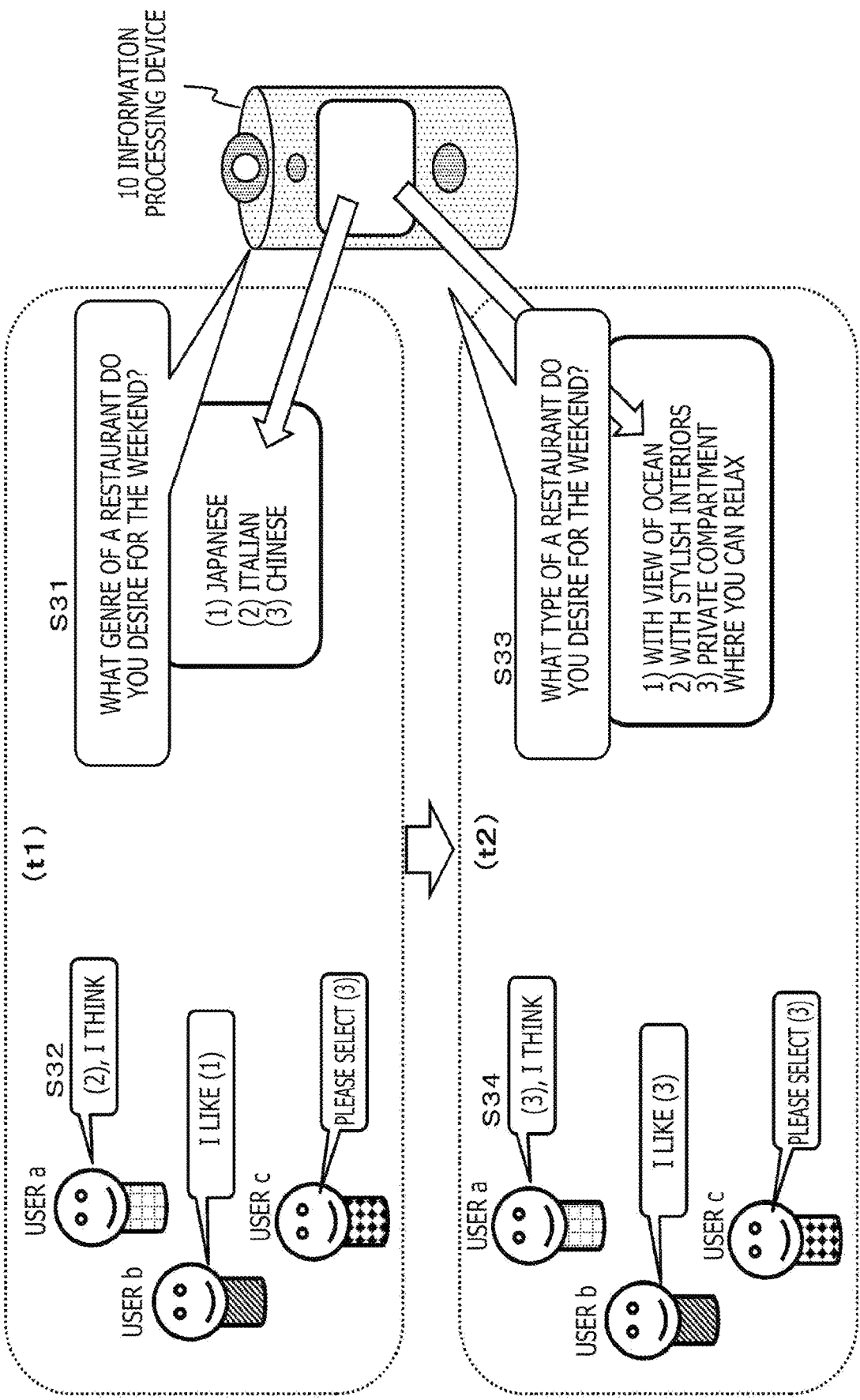
FIG. 8 is an explanatory diagram of an outline of processing which is executed by the information processing device according to the present disclosure.

FIG. 8 depicts two interaction sequences:
an interaction sequence between three users (users a to c) and the information processing device 10 in a time (t1); and
an interaction sequence between the three users (users a to c) and the information processing device 10 in a time (t2) after the time (t1).

First, the interaction sequence between the three users (users a to c) and the information processing device 10 in the time (t1) will be explained.

(Step S31)

First, at step S31, the information processing device 10 executes
system speech=What genre of a restaurant do you desire for the weekend?

The information processing device 10 outputs the above system speech through the voice output section (loudspeaker) 121, and further, displays options:
(1) Japanese
(2) Italian
(3) Chinese
through the image output section (display section) 122, as depicted in FIG. 8.

The above system speech and option information are the system speech and display information generated on the basis of information acquired from the inquiry/response DB 172 by the process execution section 171 of the process control section 170 of the data processing section 150 depicted in FIG. 3.

(Step S32) In response to the system speech and display information executed at step S31 by the information processing device 10, the users a to c respectively make the following speeches:
user a's speech=(2), I think
user b's speech=I like (1)
user c's speech=Please select (3),
at step S32.

They indicate the numbers that the respective users a to c have selected from among the options displayed on the image output section (display section) 122 by the information processing device 10, that is, the options:
(1) Japanese
(2) Italian
(3) Chinese.
That is,
the user a desires "(2) Italian,"
the user b desires "(1) Japanese," and
the user c desires "(3) Chinese."

The result of the voice recognition and the speech meaning analysis of the user speeches of the three users a to c at step S32 is inputted to the process execution section 171, so that the process execution section 171 understands that the opinions of the three users a to c do not agree.

(Step S33)

Next, at step S33, the process execution section 171 of the information processing device 10 executes a process for reaching an agreement among opinions of the users a to c. Specifically, in the time t2,
system speech=What type of a restaurant do you desire for the weekend?
is executed at step S33, as depicted in FIG. 8.

The information processing device 10 outputs the above system speech through the voice output section (loudspeaker) 121, and further, displays options:
(1) With a view of ocean
(2) With stylish interiors
(3) Private compartment where you can relax through the image output section (display section) 122, as depicted in FIG. 8.

The above system speech and option information are the system speech and display information generated on the basis of information acquired from the inquiry/response DB 172 by the process execution section 171 of the process control section 170 of the data processing section 150 depicted in FIG. 3.

(Step S34)

In response to the system speech and display information executed at step S33 by the information processing device 10, the users a to c respectively make:
user a's speech=(3), I think
user b's speech=I like (3)
user c's speech=Please select (3),
at step S34.

They indicate the numbers that the respective users a to c have selected from among the options displayed on the image output section (display section) 122 by the information processing device 10, that is, options:
(1) With a view of ocean
(2) With stylish interiors
(3) Private compartment where you can relax.
That is, all the users a to c desire "(3) private compartment where you can relax."

The result of the voice recognition and the speech meaning analysis of the user speeches of the three users a to c at step S34 is inputted to the process execution section 171, so that the process execution section 171 understands that the opinions of the three users a to c agree.

On the basis of the above result, the process execution section 171 can select, from the device characteristic information DB 173, device characteristic information that corresponds to the options with which agreement among the opinions of the three users a to c has been reached, that is, the common interest of the users a to c who like "(3) private compartment where you can relax," and can output the selected device characteristic information as a system speech.

It is to be noted that, in the example depicted in FIG. 8, the information processing device 10 succeeds in obtaining agreed opinions from the users a to c, after making two inquiries to the users. However, in a case where the opinions of the users a to c do not agree after two inquiries, three or more different inquiries are made to reach agreement among opinions from the users. A prescribed upper limit number of different inquiries are made.

Accordingly, in a case where the information processing device 10 has an interaction with a plurality of users, the information processing device 10 sequentially makes different inquires in order to reach agreement among opinions of the users.

A process sequence of processes having been explained with reference to FIG. 8, that is, processes which are executed by the information processing device 10 to converge opinions of a plurality of users who is in front of the information processing device 10, will be explained with reference to a flowchart depicted in FIG. 9.

Figure 9:
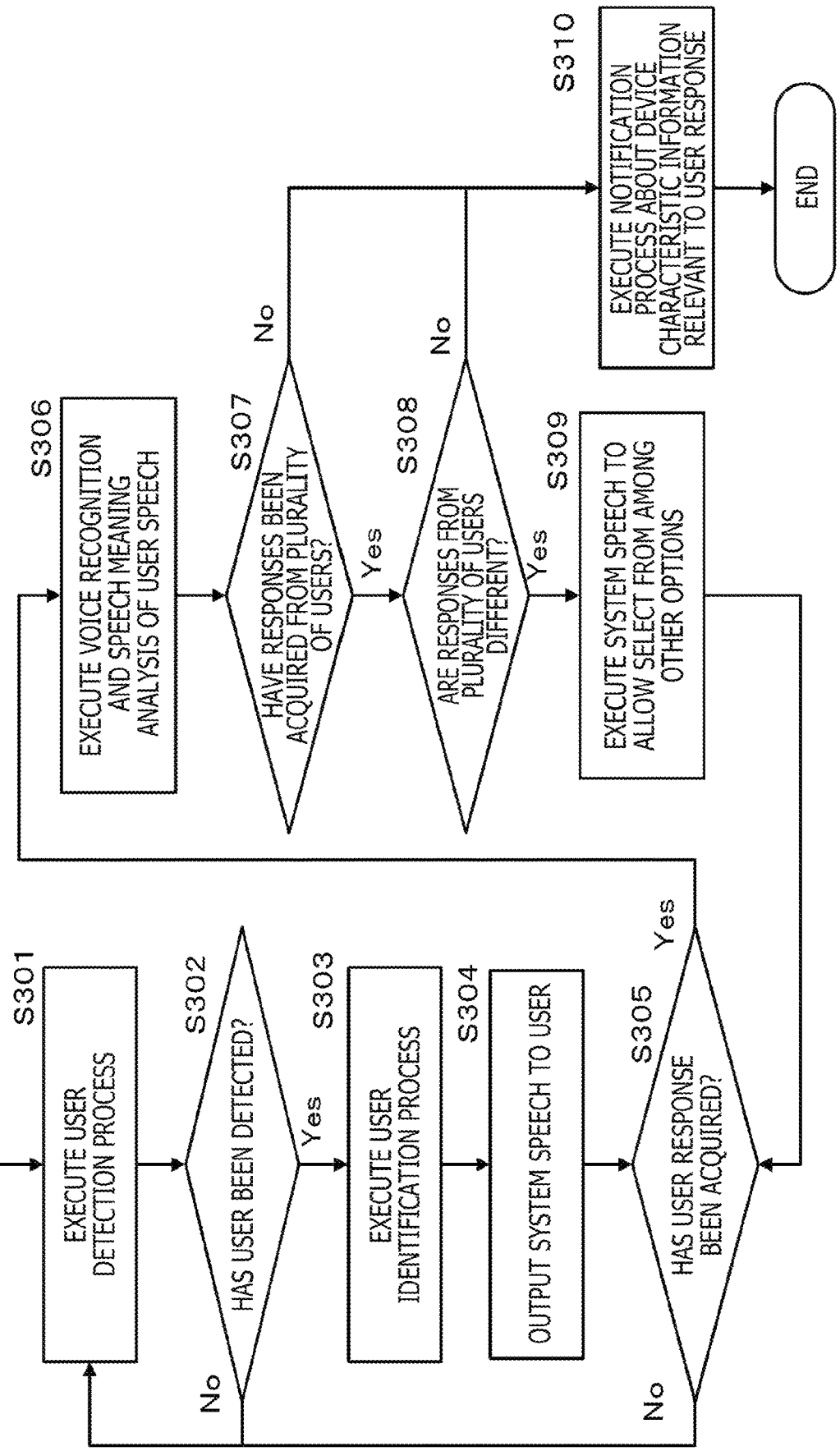
FIG. 9 is a flowchart for explaining a process sequence which is executed by the information processing device according to the present disclosure.

It is to be noted that the processes based on the flowchart depicted in FIG. 9 can be executed in accordance with a program stored in a storage section of the information processing device 10, and can be executed under control of a control section (data processing section) included in a processor such as a CPU having a program executing function, for example.

Hereinafter, steps of the flow depicted in FIG. 9 will be explained.

(Step S301)

First, at step S301, the information processing device 10 executes the user detection process.

This process is executed at the user identification section 163 of the input data analysis section 160 depicted in FIG. 3.

As previously explained, the user identification section 163 receives an input of voice information of a user speech from the voice input section (microphone) 111, and further, receives an input of a camera photograph image from the image input section (camera) 112. On the basis of the inputted information, the user identification section 163 determines whether or not any user is in front of the information processing device 10.

It is to be noted that, as in the example having been explained with reference to FIG. 8, in a case where a plurality of users is in front of the information processing device 10, each of the users is identified.

(Step S302)

In a case where it is determined at step S302 that a user who is in front of the information processing device 10 has been detected, the sequence proceeds to step S303. In a case where any user has not been detected, the sequence returns to step S301 to continue the user detection process.

(Step S303)

In a case where it is determined at step S302 that a user who is in front of the information processing device 10 has been detected, the sequence proceeds to step S303. At step S303, the user identification process is executed.

This process is also executed by the user identification section 163. The user identification section 163 receives an input of voice information of a user speech from the voice input section (microphone) 111, and further, receives an input of a camera photograph image from the image input section (camera) 112. On the basis of the inputted information, the user identification section 163 identifies the user who is in front of the information processing device 10.

It is to be noted that, as in the example having been explained with reference to FIG. 8, in a case where a plurality of users is in front of the information processing device 10, each of the users is identified.

(Step S304)

Next, at step S304, the information processing device 10 outputs a system speech to the users. For example, the system speech at step S31 depicted in FIG. 8 is outputted. That is, system speech=What type of a restaurant do you desire for the weekend?

is executed, for example.

The information processing device 10 outputs the above system speech through the voice output section (loudspeaker) 121, and further, displays options:

(1) Japanese
(2) Italian
(3) Chinese through the image output section (display section) 122, as depicted in FIG. 8.

As previously explained, the above system speech and option information are a system speech and display information generated on the basis of information acquired from the inquiry/response DB 172 by the process execution section 171 of the process control section 170 of the data processing section 150 depicted in FIG. 3.

(Step S305)

Next, at step S305, the information processing device 10 executes a process of acquiring (waiting for) responses from the users. In a case where user responses have been acquired, the sequence proceeds to step S306. In a case where all user responses have not been acquired within a prescribed waiting time period, the sequence returns to step S301 to continue the user detection process.

It is to be noted that, in a case where a plurality of users has been identified as in the example depicted in FIG. 8, a process of acquiring respective responses from the users is executed.

(Step S306)

In a case where, at step S305, a user response has been acquired within the prescribed waiting time period, the sequence proceeds to step S306. At step S306, voice recognition and speech meaning analysis of the user response are executed.

In a case where responses have been acquired from a plurality of users, voice recognition and speech meaning analysis of each of the user responses are executed.

This process is executed at the voice recognition section 161 and the speech meaning analysis section 162 of the input data analysis section 160 depicted in FIG. 3.

The result of the user speech meaning analysis executed by the speech meaning analysis section 162 is inputted to the process execution section 171 of the process control section 170.

(Step S307)

Next, at step S307, the process execution section 171 determines whether or not responses from a plurality of users have been acquired on the basis of the user speech meaning analysis result inputted from the speech meaning analysis section 162.

In a case where it is determined that responses from a plurality of users have been acquired, the sequence proceeds to step S308.

On the other hand, in a case where it is determined that responses from the plurality of users have not been acquired but a response from only one user has been acquired, the sequence proceeds to step S310.

(Step S308)

In a case where it is determined, in the determination at step S307, that responses from a plurality of users have been acquired, the sequence proceeds to step S308.

At step S308, the process execution section 171 determines whether the responses acquired from the plurality of users are different, or agree.

In a case where the responses acquired from the plurality of users are different, the sequence proceeds to step S309.

On the other hand, in a case where the responses acquired from the plurality of users agree, the sequence proceeds to step S310.

(Step S309)

In a case where it is determined at step S308 that the responses acquired from the plurality of users are different, the sequence proceeds to step S309.

At step S309, the process execution section 171 executes a new system speech to allow selection from among other options.

The above system speech is the system speech at step S33 in the time t2 in the example having been explained with reference to FIG. 8, that is, system speech=What type of a restaurant do you desire for the weekend?

The information processing device 10 outputs the above system speech through the voice output section (loudspeaker) 121, and further, displays options:

(1) With a view of ocean
(2) With stylish interiors
(3) Private compartment where you can relax through the image output section (display section) 122, as depicted in FIG. 8.

After the above system speech and option display information are outputted, the sequence proceeds to step S305 to acquire user responses. Thereafter, step S306 and subsequent steps are repeatedly executed.

When the determination at step S308 finally becomes Yes, that is, when responses from the plurality of users agree, step S310 described below is executed. Then, the sequence is ended.

(Step S310)

In a case where it is determined at step S308 that the response is given from one user or it is determined at step S308 that responses from a plurality of users agree, step S310 is executed.

In this case, at step S310, the process execution section 171 selects, from the device characteristic information DB 173, device characteristic information that is relevant to the response from one user or the agreed response from the plurality of users, and outputs the selected device characteristic information as a system speech.

As a result of this process, it is possible to cause the user to learn a device characteristic that is relevant to a subject (field) in which a single user has interest or a plurality of users has interest in common, while leaving an impression.

As explained so far, in a case where a plurality of users who is in front of the information processing device 10 makes respective various speeches, the information processing device 10 sequentially makes inquiries involving different types of options, and notifies device characteristic information that is relevant to an option with which agreement is finally reached, in order to converge opinions of the plurality of users.

It is to be noted that, in a case where opinions are not converged even after the prescribed upper limit number of inquiries are made, the process execution section 171 presents an opinion with which many users agree. Alternatively, the process execution section 171 may encourage a convergence by presenting evaluation information (reviews) corresponding to options, for example.

5. Other Examples of Processes and Functions which are Executed by Information Processing Device The embodiments have been explained above. Each of the above embodiments can be singly executed. However, any determined ones among the embodiments may be executed in combination. Furthermore, other functions, which will be explained below, may be implemented.

In the above-described embodiments, when selecting, from the device characteristic DB 173, device characteristic information to be notified to a user, the process execution section 171 of the information processing device 10 selects a device characteristic that is relevant to an interaction between the information processing device 10 and the user. Specifically, the information processing device 10 notifies device characteristic information that is relevant to an option that the user has selected from among options presented to the user by the information processing device 10, for example.

To select the device characteristic information to be notified, not only what is talked about during an interaction but also a priority of the device characteristic information may be used.

For example, notification priority information is set for each of multiple sets of device characteristic information stored in the device characteristic DB 173. By referring to an interaction with a user and to the notification priorities, the process execution section 171 may select device characteristic information to be notified.

Furthermore, device characteristic information that is relevant to a function being used by a user who is having an interaction with the information processing device 10 may be preferentially selected and notified. The information processing device 10 acquires a log indicating functions used by each user to use the information processing device 10, and stores the log in a memory. By referring to the log, the process execution section 171 may select device characteristic information to be notified. For example, a device characteristic that is relevant to a function being used by a user is preferentially selected and notified.

Furthermore, statistical information about a family member other than a user who is having an interaction with the information processing device 10 or about multiple users may be used to select characteristic information to be notified to the user, and generate an inquiry and options to be presented to the user.

Furthermore, according to a state (environment) change detected by the information processing device 10, characteristic information to be notified to a user may be selected, and an inquiry and options to be presented to the user may be generated.

For example, in a case where occurrence of cancelation of many speeches or occurrence of many restatements is detected in an environment in which much surrounding noise is generated in daytime hours or the like, the information processing device 10 executes a system speech involving the following inquiry and options.

System speech=What do you do in daytime hours in this room?

Options:
(1) Watch TV
(2) Play a board game
(3) Practice of playing a musical instrument For example, in a case where the user selects (1) in response to presentation of the above options, the process execution section 171 of the information processing device 10 outputs a system speech including device characteristic information:

system speech=Sometimes I mishear TV sounds for your voice or your father's or mother's voice.

In addition, the information processing device 10 may set an open-ended option in options to be presented to a user. For example, among (1) Watch TV
(2) Play a board game
(3) Others, the option "(3) others" may be set.

In a case where the user selects "(3) others," the information processing device 10 outputs, for example, system speech=Tell me specifically.

In this manner, a more specific user response can be obtained by execution of step-by-step inquires. Thus, a device characteristic to be notified to the user can be set to be closer to a user's interest.

In addition, the following configurations are possible:

(1) Not only a voice, but also a keyboard, a touch panel, or the like can be used as user input means.

(2) Cases in other houses, and the past inquiries and responses are stored in a storage section of the device or in a network connection server, and an inquiry and options are generated and outputted with reference to the stored cases and the past inquires and responses.

(3) Whether to continue or stop an interaction is determined while a condition (the degree of busyness of a user) or the like is taken into consideration.

(4) In a case where a new function is installed into the information processing device 10, for example, a characteristic of the new function is preferentially notified.

(5) Characteristic information that is relevant to a function which has not been used by a user is preferentially notified.

(6) An inquiry to a user is changed according to a user's condition (a state of being in confusion, a state of taking time to make a response, a facial expression, a way of talking, a visual line, a state of paying no attention) or the like, or is changed according to a combination of multiple users.

(7) An interaction with the user is made with use of multiple devices through cooperation with other devices (mobile devices).

For examples, any one of the configurations for executing the above processes may be adopted.

6. Configuration Example of Information Processing Device and Information Processing System The embodiments have been explained. The various processing functions explained in the embodiments, such as processing functions of the components of the information processing device 10 depicted in FIG. 3 may be all included in one device such as an agent device, a smartphone, or a PC possessed by a user. Alternatively, one or more of the functions may be executed in a server or the like.

FIGS. 10A and 10B depict system configuration examples.

In FIG. 10A information processing system configuration example 1 in FIGS. 10A and 10B, almost all the functions of the information processing device depicted in FIG. 3 are included in one device, that is, an information processing device 410 which is a user terminal such as a user's smartphone, a user's PC, or a user's agent device having a voice input/output function and an image input/output function.

The information processing device 410 which corresponds to a user terminal communicates with an application execution server 420 only in the case of using an external application to make a response to a user, for example.

The application execution server 420 includes, for example, a weather information providing server, a traffic information providing server, a medical information providing server, a tourist information providing server, or the like, that is, a server capable of providing information for generating a response to a user speech, for example.

In FIG. 10B information processing system configuration example 2 in FIGS. 10A and 10B, one or more of the functions of the information processing device depicted in FIG. 3 are included in the information processing device 410 which is a user terminal such as a user's smartphone, a user's PC, or a user's agent device, while the other functions are executed in a data processing server 460 that is capable of communicating with the information processing device.

For example, only the input section 110 and the output section 120 of the device depicted in FIG. 3 may be disposed in the information processing device 410 side which is the user terminal side, while the other functions are all executed by the server side.

Specifically, a possible system configuration is as follows. For example, an information processing system includes a user terminal and a data processing server. The user terminal includes a voice input section that receives an input of a user speech, and a voice output section that outputs a system speech generated by the data processing server. Meanwhile, the data processing server generates a system speech and outputs the system speech to the user terminal, and further, selects system characteristic information that is relevant to an interaction between a user and the user terminal, and transmits and outputs a system speech including the selected system characteristic information to the user terminal. This configuration is possible, for example.

It is to be noted that the system characteristic information in the above configuration corresponds to the device characteristic information in each of the above-described embodiments, and indicates a characteristic of the information processing system (interaction system) that includes the server and the user terminal.

For example, the data processing server receives an input of information of user selection made to options presented to a user, selects system characteristic information that is relevant to the inputted selection information, and outputs the system characteristic information to the user terminal, so that the user on the user terminal side can get to know the system characteristic.

It is to be noted that various settings can be performed for a function dividing form of functions on the user terminal side and functions on the server side. Further, one function may be executed by both the user terminal side and the server side.

7. Hardware Configuration Example of Information Processing Device

Next, a hardware configuration example of the information processing device will be explained with reference to FIG. 11.

Figure 11:
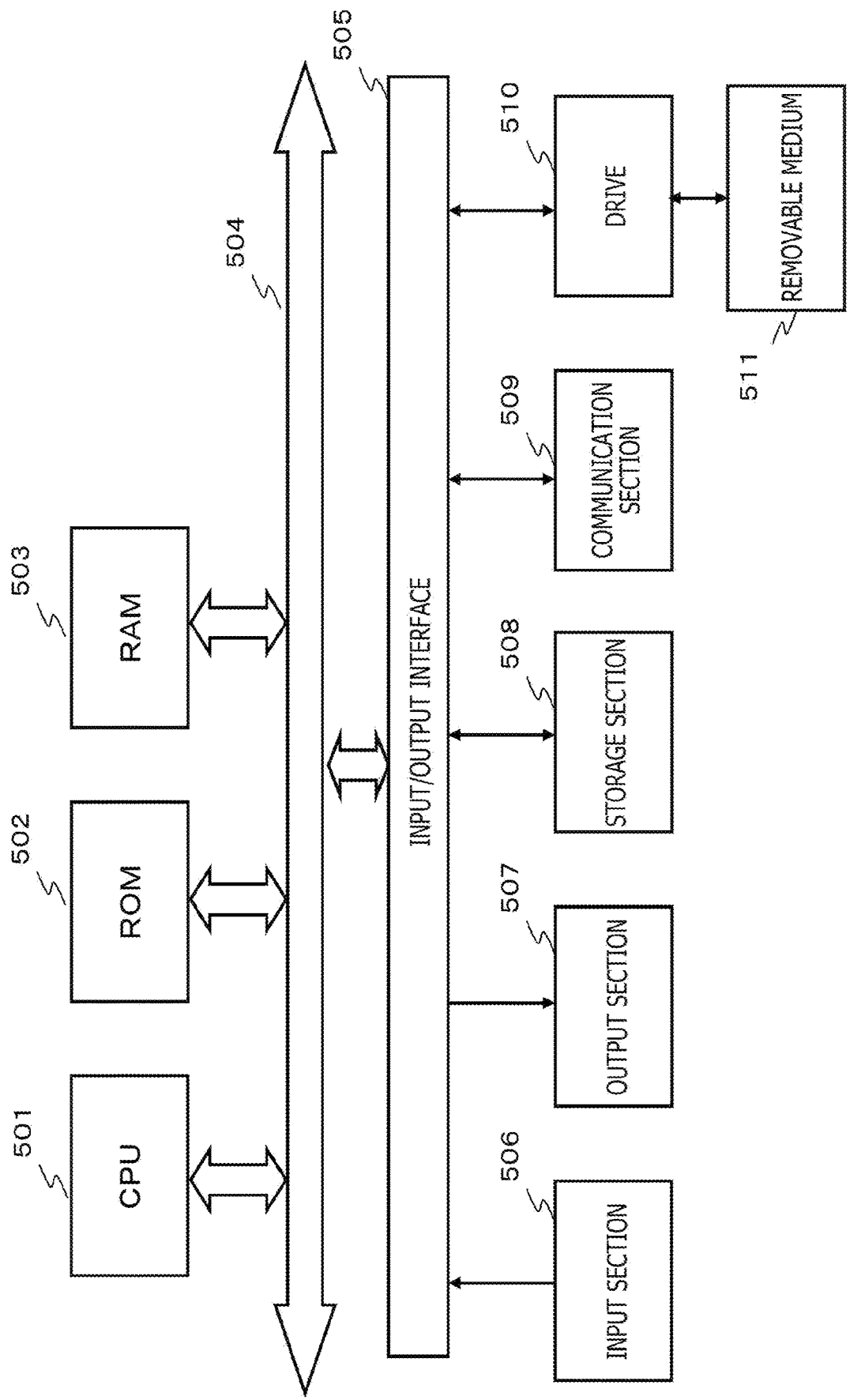
FIG. 11 is an explanatory diagram of a hardware configuration example of the information processing device.

The hardware which will be explained with reference to FIG. 11 is a hardware configuration example of the information processing device having been explained with reference to FIG. 3, and is one example of the hardware configuration of the information processing device that constitutes the data processing server 460 having been explained with reference to FIGS. 10A and 10B.

A CPU (Central Processing Unit) 501 functions as a control section or data processing section to execute various processes in accordance with a program stored in a ROM (Read Only Memory) 502 or a storage section 508. For example, the CPU 501 executes the processes based on any one of the sequences explained in the above embodiments. For example, data or the program to be executed by the CPU

501 is stored in a RAM (Random Access Memory) 503. The CPU 501, the ROM 502, and the RAM 503 are mutually connected via a bus 504.

The CPU 501 is connected to an input/output interface 505 via the bus 504. An input section 506 that includes various switches, a keyboard, a mouse, a microphone, a sensor, or the like, and an output section 507 that includes a display, a loudspeaker, or the like, are connected to the input/output interface 505. The CPU 501 executes various processes in response to a command inputted through the input section 506, and outputs the process result to the output section 507, for example.

The storage section 508 which is connected to the input/output interface 505 includes a hard disk or the like, and stores various types of data and the program to be executed by the CPU 501. A communication section 509 functions as a transmission/reception section for Wi-Fi communication, Bluetooth (registered trademark) (BT) communication, and any other data communication over a network such as the Internet or a local area network, and communicates with an external device.

A drive 510 which is connected to the input/output interface 505 records or reads out data by driving a removable medium 511 such as a magnetic disk, an optical disk, a magneto-optical disk, or a semiconductor memory including a memory card.

8. Conclusion of Configurations According to Present Disclosure

With reference to the specific embodiments, the embodiments according to the present disclosure have been explained in detail. However, it is obvious that a person skilled in the art can make modification or substitution on the embodiments within the gist of the present disclosure. That is, the present invention has been disclosed in a form of exemplifications, and thus, should not be limitedly interpreted. In order to assess the gist of the present disclosure, the claims should be considered.

It is to be noted that the technology disclosed herein may have the following configurations.

(1) An information processing device including
a data processing section that generates and outputs a system speech including device characteristic information, in which
the data processing section selects device characteristic information that is relevant to what is talked about during an interaction between a user and the information processing device, and generates and outputs a system speech including the selected device characteristic information.

(2) The information processing device according to (1), in which
the data processing section receives an input of information of a user selection made to an option presented to a user, and selects and outputs device characteristic information that is relevant to the inputted selection information.

(3) The information processing device according to (1) or (2), in which
the data processing section includes the device characteristic information into a system speech to be executed in an interaction with the user, and outputs the system speech.

(4) The information processing device according to any one of (1) to (3), in which
the data processing section
outputs, as an inquiry to the user, an inquiry involving a plurality of options, and
receives, as a user response to the inquiry, information of a user selection made to the options, and selects and outputs device characteristic information that is relevant to the inputted selection information.

(5) The information processing device according to any one of (1) to (4), in which
the data processing section outputs a system response in response to a process request from the user, and then, outputs, to the user, an inquiry that is relevant to the system response, receives a user response to the inquiry, and selects and outputs device characteristic information that is relevant to the inputted user response.

(6) The information processing device according to any one of (1) to (5), in which
in a case where a plurality of users makes responses to an inquiry made by the information processing device,
the data processing section sequentially outputs different inquires or sequentially outputs an inquiry while changing an option or an attribute until responses from the plurality of users agree or until a prescribed upper limit number of times is reached.

(7) The information processing device according to (6), in which
in a case where responses from the plurality of users agree, the data processing section selects and outputs device characteristic information that is relevant to the agreed response.

(8) The information processing device according to any one of (1) to (7), in which
the information processing device includes a device characteristic information database in which device characteristic information is stored, and
the data processing section generates and outputs a system speech including device characteristic information acquired from the device characteristic information database.

(9) The information processing device according to (8), in which
the device characteristic information database includes a configuration in which device characteristic information for which notification priority information is set is stored, and
the data processing section preferentially outputs device characteristic information that has a high notification priority.

(10) The information processing device according to any one of (1) to (9), in which
the information processing device further includes a user information database in which, for each user, device characteristic information notified to the user or an identifier of the device characteristic information is stored.

(11) An information processing system including
a user terminal; and
a data processing server, in which
the user terminal includes
a voice input section that receives an input of a user speech, and
a voice output section that outputs a system speech generated by the data processing server, and the data processing server generates a system speech, outputs the system speech to the user terminal, and further, selects and outputs system characteristic information that is relevant to what is talked about during an interaction between a user and the user terminal.

(12) The information processing system according to (11), in which
the system characteristic information includes information indicative of a characteristic of the information processing system including the data processing server and the user terminal.

(13) The information processing system according to (11) or (12), in which
the data processing server receives an input of information of a user selection made to an option presented to a user, selects system characteristic information that is relevant to the inputted selection information, and outputs the selected system characteristic information to the user terminal.

(14) An information processing method that is executed by an information processing device, in which
the information processing device includes a data processing section that generates and outputs a system speech including device characteristic information, and
the data processing section selects device characteristic information that is relevant to what is talked about during an interaction between a user and the information processing device, and generates and outputs a system speech including the selected device characteristic information.

(15) An information processing method that is executed by an information processing system including a user terminal and a data processing server, in which
the user terminal receives an input of a user speech through a voice input section, and transmits the user speech to the data processing server, and
the data processing server generates a system speech, outputs the system speech to the user terminal, and further, selects and outputs system characteristic information that is relevant to what is talked about during an interaction between a user and the user terminal.

(16) A program for causing an information processing device to execute information processing, in which
the information processing device includes a data processing section that generates and outputs a system speech including device characteristic information, and
the program causes the data processing section to select device characteristic information that is relevant to what is talked about during an interaction between a user and the information processing device, and to generate and output a system speech including the selected device characteristic information.

Further, a series of the processes explained herein can be executed by hardware, software, or a composite structure thereof. In a case where the processes are executed by software, a program having a sequence of the processes recorded therein can be executed after being installed into a memory of a computer incorporated in dedicated hardware, or can be executed after being installed into a general-purpose computer capable of various processes. For example, such a program may be previously recorded in a recording medium. The program can be installed into the computer from the recording medium. Alternatively, the program can be received over a network such as a LAN (Local Area Network) or the Internet, and be installed into a recording medium such as an internal hard disk.

It is to be noted that the processes explained herein are not necessarily executed in the explained time-series order, and the processes may be executed parallelly or separately, as needed or according to the processing capacity of a device to execute the processes. Further, in the present description, a system refers to a logical set structure including a plurality of devices, and the devices in the structure are not necessarily included in the same casing.

INDUSTRIAL APPLICABILITY

As explained so far, with the configuration of one embodiment according to the present disclosure, a system speech including a device characteristic is naturally generated and outputted during an interaction with a user, so that the device characteristic can be reliably notified to the user.

Specifically, a data processing section that generates and outputs a system speech including device characteristic information is included, for example. The data processing section selects device characteristic information that is relevant to what is talked about during an interaction between the user and the information processing device, and generates and outputs a system speech including the selected device characteristic information. The data processing section receives an input of information of user selection made to options presented to the user, and includes, into a system speech to be executed in an interaction with the user, device characteristic information that is relevant to the inputted selection information, and outputs the system speech.

With this configuration, a system speech including a device characteristic is naturally generated and outputted during an interaction with a user, so that the device characteristic can be reliably notified to the user.

REFERENCE SIGNS LIST

10 Information processing device
11 Camera
12 Microphone
13 Display section
14 Loudspeaker
20 Server
30 External device
110 Input section
111 Voice input section
112 Image input section
120 Output section
121 Voice output section
122 Image output section
150 Data processing section
160 Input data analysis section
161 Voice recognition section
162 Speech meaning analysis section
163 User identification section
164 User information DB
170 Process control section
171 Process execution section
172 Inquiry/response information DB
173 Device characteristic information DB
180 Output control section
181 Output voice control section
182 Display information control section
410 Information processing device
420 Application execution server
460 Data processing server
501 CPU
502 ROM 503 RAM
504 Bus
505 Input/output interface
506 Input section
507 Output section
508 Storage section
509 Communication section
510 Drive
511 Removable medium

The invention claimed is:

1. An information processing device, comprising:
a data processing section configured to:
- identify a user based on user information related to the user;
- output a first system speech based on the identified user, wherein
  - the first system speech includes a first inquiry to the user from a plurality of inquiries stored in a database, and
  - the plurality of inquiries is related to a plurality of fields in which the user is possibly interested;
- output a plurality of options related to the first inquiry;
- receive, as a first user response to the first inquiry, selection information of a first option selected by the user from the plurality of options, wherein the first option selected by the user indicates a field of interest of the user;
- select device characteristic information of the information processing device based on the first option selected by the user, wherein the selected device characteristic information is relevant to the field of interest of the user; and
- output a second system speech including the selected device characteristic information.

2. The information processing device according to claim 1, wherein the data processing section is further configured to:
- output a system response in response to a process request from the user;
- output a second inquiry of the plurality of inquiries to the user subsequent to the output of the system response, wherein the second inquiry is relevant to the system response;
- receive a second user response to the second inquiry;
- select the device characteristic information based on the second user response; and
- output a third system speech including the selected device characteristic information.

3. The information processing device according to claim 1, wherein
based on receipt of a plurality of user responses from a plurality of users to the first inquiry, the data processing section is further configured to:
- sequentially output different inquires; or
- sequentially output a second inquiry of the plurality of inquiries, and change one of a second option of the plurality of options or an attribute related to the second inquiry until one of:
  - the plurality of user responses from the plurality of users agrees, or
  - a number of times the second inquiry is output reaches an upper limit,
the plurality of user responses includes the first user response, and
the plurality of users includes the user.

4. The information processing device according to claim 3, wherein based on an agreement between the plurality of user responses from the plurality of users, the data processing section is further configured to select the device characteristic information relevant to a second user response agreed upon by the plurality of users.

5. The information processing device according to claim 1, further comprising a device characteristic information database configured to store a plurality of sets of the device characteristic information,
wherein the data processing section is further configured to:
- select the device characteristic information from the plurality of sets of the device characteristic information stored in the device characteristic information database; and
- output the second system speech including the selected device characteristic information.

6. The information processing device according to claim 5, wherein
the device characteristic information database is further configured to store each of the plurality of sets of the device characteristic information in association with notification priority information, and
the data processing section is further configured to preferentially output the device characteristic information that has a highest notification priority among the plurality of sets of the device characteristic information stored in the device characteristic information database.

7. The information processing device according to claim 1, further comprising a user information database configured to store, for the user associated with the information processing device, at least one of the device characteristic information or an identifier of the device characteristic information.

8. An information processing system, comprising:
a user terminal that includes:
- a voice input section configured to receive an input of a user speech; and
- a voice output section configured to output a first system speech; and
a data processing server configured to:
- identify a user associated with the user terminal based on user information related to the user, wherein the user information includes the user speech;
- output the first system speech to the user terminal based on the identified user, wherein
  - the first system speech includes an inquiry to the user from a plurality of inquiries stored in a database, and
  - the plurality of inquiries is related to a plurality of fields in which the user is possibly interested;
- output, to the user terminal, a plurality of options related to the inquiry;
- receive, as a user response to the inquiry, selection information of an option selected by the user from the plurality of options, wherein the option selected by the user indicates a field of interest of the user;
- select system characteristic information based on the option selected by the user, wherein the selected system characteristic information is relevant to the field of interest of the user; and
- output a second system speech to the user terminal, wherein the second system speech includes the selected system characteristic information.

9. The information processing system according to claim 8, wherein the selected system characteristic information includes information indicative of a characteristic of the information processing system including the data processing server and the user terminal.

10. An information processing method executed by an information processing device, the information processing method comprising:
- identifying a user based on user information related to the user;
- outputting a first system speech based on the identified user, wherein
  - the first system speech includes an inquiry to the user from a plurality of inquiries stored in a database, and
  - the plurality of inquiries is related to a plurality of fields in which the user is possibly interested;
- outputting a plurality of options related to the inquiry;
- receiving, as a user response to the inquiry, selection information of an option selected by the user from the plurality of options, wherein the option selected by the user indicates a field of interest of the user;
- selecting device characteristic information of the information processing device based on the option selected by the user, wherein the selected device characteristic information is relevant to the field of interest of the user; and
- outputting a second system speech including the selected device characteristic information.

11. An information processing method executed by an information processing system including a user terminal and a data processing server, the information processing method comprising:
- receiving, by the user terminal, an input of a user speech through a voice input section;
- transmitting, by the user terminal, the user speech to the data processing server;
- identifying, by the data processing server, a user associated with the user terminal based on user information related to the user, wherein the user information includes the user speech;
- outputting, by the data processing server, a first system speech to the user terminal based on the identified user, wherein
  - the first system speech includes an inquiry to the user from a plurality of inquiries stored in a database, and
  - the plurality of inquiries is related to a plurality of fields in which the user is possibly interested;
- outputting, by the data processing server, a plurality of options to the user terminal, wherein the plurality of options is related to the inquiry;
- receiving, by the data processing server, a user response to the inquiry, wherein
  - the user response includes selection information of an option selected by the user from the plurality of options, and
  - the option selected by the user indicates a field of interest of the user;
- selecting, by the data processing server, system characteristic information based on the option selected by the user, wherein the selected system characteristic information is relevant to the field of interest of the user; and
- outputting, by the data processing server, a second system speech to the user terminal, wherein the second system speech includes the selected system characteristic information.

12. A non-transitory computer-readable medium having stored thereon, computer-executable instructions which, when executed by a computer, cause the computer to execute operations, the operations comprising:
- identifying a user based on user information related to the user;
- outputting a first system speech based on the identified user, wherein
  - the first system speech includes an inquiry to the user from a plurality of inquiries stored in a database, and
  - the plurality of inquiries is related to a plurality of fields in which the user is possibly interested;
- outputting a plurality of options related to the inquiry;
- receiving, as a user response to the inquiry, selection information of an option selected by the user from the plurality of options, wherein the option selected by the user indicates a field of interest of the user;
- selecting device characteristic information of an information processing device based on the option selected by the user, wherein the selected device characteristic information is relevant to the field of interest of the user; and
- outputting a second system speech including the selected device characteristic information.

\* \* \* \* \*